United States Patent
Anklam et al.

(10) Patent No.: US 11,697,538 B2
(45) Date of Patent: Jul. 11, 2023

(54) BUNDLED PRODUCT AND SYSTEM AND METHOD FOR FORMING THE SAME

(71) Applicant: First Quality Tissue, LLC, Great Neck, NY (US)

(72) Inventors: Chris B. Anklam, Anderson, SC (US); Byrd Tyler Miller, IV, Easley, SC (US); Justin S. Pence, Anderson, SC (US); James E. Sealey, II, Belton, SC (US)

(73) Assignee: First Quality Tissue, LLC, Great Neck, NY (US)

( * ) Notice: Subject to any disclaimer, the term of this patent is extended or adjusted under 35 U.S.C. 154(b) by 0 days.

(21) Appl. No.: 16/986,552

(22) Filed: Aug. 6, 2020

(65) Prior Publication Data

US 2020/0369447 A1 Nov. 26, 2020

Related U.S. Application Data

(63) Continuation-in-part of application No. 16/445,598, filed on Jun. 19, 2019.

(51) Int. Cl.
*B65D 71/08* (2006.01)
*B65D 65/40* (2006.01)
(Continued)

(52) U.S. Cl.
CPC .............. *B65D 71/08* (2013.01); *B32B 27/08* (2013.01); *B32B 27/20* (2013.01); *B32B 27/32* (2013.01);
(Continued)

(58) Field of Classification Search
CPC ...... B65D 71/08; B65D 75/002; B65D 85/08; B65D 85/672; B65D 65/40; B65B 25/146;
(Continued)

(56) References Cited

U.S. PATENT DOCUMENTS 2,919,467 A 1/1960 Mercer
2,926,154 A 2/1960 Keim
(Continued)

FOREIGN PATENT DOCUMENTS

CA 2168894 A1 8/1997
CA 2795139 A1 10/2011
(Continued)

*Primary Examiner* — Rafael A Ortiz
(74) *Attorney, Agent, or Firm* — Amster, Rothstein & Ebenstein LLP

(57) ABSTRACT

A direct-to-consumer heat shrunk bundled product made up of a plurality of paper product rolls each individually packaged by a first package material and arranged relative to one another so as to form a bundle, the bundle being packaged by a second package material, wherein a substantial portion of the inner surface of the second package material is in contact with the first package material of the plurality of paper product rolls and is nonstick relative to the first package material. The bundle includes fused end seals so that the bundle does not include open gussets that might otherwise catch on machinery during sorting and shipping. The packaging material and/or wrapper may include laser energy absorbing material or adhesive.

20 Claims, 12 Drawing Sheets

(51) Int. Cl.
*B32B 27/08* (2006.01)
*B32B 27/20* (2006.01)
*B32B 27/32* (2006.01)
*B65B 53/02* (2006.01)
*B65B 9/10* (2006.01)

(52) U.S. Cl.
CPC ............... *B65B 9/10* (2013.01); *B65B 53/02* (2013.01); *B65D 65/40* (2013.01); *B32B 2250/02* (2013.01); *B32B 2250/242* (2013.01); *B32B 2264/101* (2013.01); *B32B 2264/104* (2013.01); *B32B 2307/21* (2013.01); *B32B 2307/736* (2013.01); *B32B 2553/00* (2013.01)

(58) Field of Classification Search
CPC .......... B65B 53/02; B65B 9/10; B65B 27/32; B65B 27/20; B65B 27/08
USPC ....................................................... 206/391
See application file for complete search history.

(56) References Cited

U.S. PATENT DOCUMENTS

| | | | |
|---|---|---|---|
| 3,026,231 A | 3/1962 | Chavannes | |
| 3,049,469 A | 8/1962 | Davison | |
| 3,058,873 A | 10/1962 | Keim et al. | |
| 3,066,066 A | 11/1962 | Keim et al. | |
| 3,097,994 A | 7/1963 | Dickens et al. | |
| 3,125,552 A | 3/1964 | Loshaek et al. | |
| 3,143,150 A | 8/1964 | Buchanan | |
| 3,186,900 A | 6/1965 | De Young | |
| 3,197,427 A | 7/1965 | Schmalz | |
| 3,224,986 A | 12/1965 | Suter et al. | |
| 3,224,990 A | 12/1965 | Babcock | |
| 3,227,615 A | 1/1966 | Korden | |
| 3,227,671 A | 1/1966 | Keim | |
| 3,239,491 A | 3/1966 | Tsou et al. | |
| 3,240,664 A | 3/1966 | Earle, Jr. | |
| 3,240,761 A | 3/1966 | Keim et al. | |
| 3,248,280 A | 4/1966 | Hyland, Jr. | |
| 3,250,664 A | 5/1966 | Conte et al. | |
| 3,252,181 A | 5/1966 | Hureau | |
| 3,301,746 A | 1/1967 | Sanford et al. | |
| 3,311,594 A | 3/1967 | Earle, Jr. | |
| 3,329,657 A | 7/1967 | Strazdins et al. | |
| 3,332,834 A | 7/1967 | Reynolds, Jr. | |
| 3,332,901 A | 7/1967 | Keim | |
| 3,352,833 A | 11/1967 | Earle, Jr. | |
| 3,381,817 A | 5/1968 | Harm | |
| 3,384,692 A | 5/1968 | Galt et al. | |
| 3,414,459 A | 12/1968 | Wells | |
| 3,424,306 A * | 1/1969 | Munck ................... | B65D 75/54 206/466 |
| 3,442,754 A | 5/1969 | Espy | |
| 3,459,697 A | 8/1969 | Goldberg et al. | |
| 3,473,576 A | 10/1969 | Amneus | |
| 3,483,077 A | 12/1969 | Aldrich | |
| 3,545,165 A | 12/1970 | Greenwell | |
| 3,556,932 A | 1/1971 | Coscia et al. | |
| 3,573,164 A | 3/1971 | Friedberg et al. | |
| 3,587,201 A | 6/1971 | Joseph | |
| 3,609,126 A | 9/1971 | Asao et al. | |
| 3,666,609 A | 5/1972 | Kalwaites et al. | |
| 3,672,949 A | 6/1972 | Brown | |
| 3,672,950 A | 6/1972 | Murphy et al. | |
| 3,773,290 A | 11/1973 | Mowery | |
| 3,778,339 A | 12/1973 | Williams et al. | |
| 3,813,362 A | 5/1974 | Coscia et al. | |
| 3,855,158 A | 12/1974 | Petrovich et al. | |
| 3,877,510 A | 4/1975 | Tegtmeier et al. | |
| 3,905,863 A | 9/1975 | Ayers | |
| 3,911,173 A | 10/1975 | Sprague, Jr. | |
| 3,933,244 A * | 1/1976 | Hughes ................... | B65D 75/38 426/415 |
| 3,974,025 A | 8/1976 | Ayers | |
| 3,994,771 A | 11/1976 | Morgan, Jr. et al. | |
| 3,998,690 A | 12/1976 | Lyness et al. | |
| 4,038,008 A | 7/1977 | Larsen | |
| 4,075,382 A | 2/1978 | Chapman et al. | |
| 4,088,528 A | 5/1978 | Berger et al. | |
| 4,098,632 A | 7/1978 | Sprague, Jr. | |
| 4,102,737 A | 7/1978 | Morton | |
| 4,129,528 A | 12/1978 | Petrovich et al. | |
| 4,147,586 A | 4/1979 | Petrovich et al. | |
| 4,184,519 A | 1/1980 | McDonald et al. | |
| 4,190,692 A | 2/1980 | Larsen | |
| 4,191,609 A | 3/1980 | Trokhan | |
| 4,252,761 A | 2/1981 | Schoggen et al. | |
| 4,320,162 A | 3/1982 | Schulz | |
| 4,331,510 A | 5/1982 | Wells | |
| 4,382,987 A | 5/1983 | Smart | |
| 4,440,597 A | 4/1984 | Wells et al. | |
| 4,501,862 A | 2/1985 | Keim | |
| 4,507,351 A | 3/1985 | Johnson et al. | |
| 4,514,345 A | 4/1985 | Johnson et al. | |
| 4,515,657 A | 5/1985 | Maslanka | |
| 4,528,239 A | 7/1985 | Trokhan | |
| 4,529,480 A | 7/1985 | Trokhan | |
| 4,535,587 A | 8/1985 | Rias | |
| 4,537,657 A | 8/1985 | Keim | |
| 4,545,857 A | 10/1985 | Wells | |
| 4,595,093 A | 6/1986 | Eckstein | |
| 4,637,859 A | 1/1987 | Trokhan | |
| 4,678,590 A | 7/1987 | Nakamura et al. | |
| 4,714,736 A | 12/1987 | Juhl et al. | |
| 4,770,920 A | 9/1988 | Larsonneur | |
| 4,780,357 A | 10/1988 | Akao | |
| 4,808,467 A | 2/1989 | Suskind et al. | |
| 4,836,894 A | 6/1989 | Chance et al. | |
| 4,849,054 A | 7/1989 | Klowak | |
| 4,885,202 A | 12/1989 | Lloyd et al. | |
| 4,886,167 A * | 12/1989 | Dearwester ............ | B65D 75/00 206/83.5 |
| 4,891,249 A | 1/1990 | McIntyre | |
| 4,909,284 A | 3/1990 | Kositzke | |
| 4,949,668 A | 8/1990 | Heindel et al. | |
| 4,949,688 A | 8/1990 | Bayless | |
| 4,971,197 A | 11/1990 | Worley | |
| 4,983,256 A | 1/1991 | Combette et al. | |
| 4,996,091 A | 2/1991 | McIntyre | |
| 5,027,582 A | 7/1991 | Dearwester | |
| 5,059,282 A | 10/1991 | Ampulski et al. | |
| 5,143,776 A | 9/1992 | Givens | |
| 5,149,401 A | 9/1992 | Langevin et al. | |
| 5,152,874 A | 10/1992 | Keller | |
| 5,211,813 A | 5/1993 | Sawley et al. | |
| 5,239,047 A | 8/1993 | Devore et al. | |
| 5,279,098 A | 1/1994 | Fukuda | |
| 5,281,306 A | 1/1994 | Kakiuchi et al. | |
| 5,334,289 A | 8/1994 | Trokhan et al. | |
| 5,347,795 A | 9/1994 | Fukuda | |
| 5,397,435 A | 3/1995 | Ostendorf et al. | |
| 5,399,412 A | 3/1995 | Sudall et al. | |
| 5,405,501 A | 4/1995 | Phan et al. | |
| 5,409,572 A | 4/1995 | Kershaw et al. | |
| 5,429,686 A | 7/1995 | Chi et al. | |
| 5,439,559 A | 8/1995 | Crouse | |
| 5,447,012 A | 9/1995 | Kovacs et al. | |
| 5,470,436 A | 11/1995 | Wagle et al. | |
| 5,487,313 A | 1/1996 | Johnson | |
| 5,509,913 A | 4/1996 | Yeo | |
| 5,510,002 A | 4/1996 | Hermans et al. | |
| 5,529,665 A | 6/1996 | Kaun | |
| 5,551,563 A | 9/1996 | Allen | |
| 5,581,906 A | 12/1996 | Ensign et al. | |
| 5,591,147 A | 1/1997 | Couture-Dorschner et al. | |
| 5,607,551 A | 3/1997 | Farrington, Jr. et al. | |
| 5,611,890 A | 3/1997 | Vinson et al. | |
| 5,628,876 A | 5/1997 | Ayers et al. | |
| 5,635,028 A | 6/1997 | Vinson et al. | |
| 5,649,916 A | 7/1997 | Dipalma et al. | |
| 5,671,897 A | 9/1997 | Ogg et al. | |
| 5,672,248 A | 9/1997 | Wendt et al. | |
| 5,679,222 A | 10/1997 | Rasch et al. | |

(56) References Cited

U.S. PATENT DOCUMENTS

| | | |
|---|---|---|
| 5,685,428 A | 11/1997 | Herbers et al. |
| 5,728,268 A | 3/1998 | Weisman et al. |
| 5,746,887 A | 5/1998 | Wendt et al. |
| 5,753,067 A | 5/1998 | Fukuda et al. |
| 5,772,845 A | 6/1998 | Farrington, Jr. et al. |
| 5,806,569 A | 9/1998 | Gulya et al. |
| 5,814,382 A * | 9/1998 | Yannuzzi, Jr. ..... B65D 81/3469 428/35.5 |
| 5,827,384 A | 10/1998 | Canfield et al. |
| 5,832,962 A | 11/1998 | Kaufman et al. |
| 5,846,380 A | 12/1998 | Van Phan et al. |
| 5,855,738 A | 1/1999 | Weisman et al. |
| 5,858,554 A | 1/1999 | Neal et al. |
| 5,865,396 A | 2/1999 | Ogg et al. |
| 5,865,950 A | 2/1999 | Vinson et al. |
| 5,893,965 A | 4/1999 | Trokhan et al. |
| 5,913,765 A | 6/1999 | Jurgess et al. |
| 5,934,470 A | 8/1999 | Bauer et al. |
| 5,942,085 A | 8/1999 | Neal et al. |
| 5,944,954 A | 8/1999 | Vinson et al. |
| 5,948,210 A | 9/1999 | Huston |
| 5,980,691 A | 11/1999 | Weisman et al. |
| 6,036,139 A | 3/2000 | Ogg |
| 6,039,838 A | 3/2000 | Kaufman et al. |
| 6,048,938 A | 4/2000 | Neal et al. |
| 6,060,149 A | 5/2000 | Nissing et al. |
| 6,106,670 A | 8/2000 | Weisman et al. |
| 6,149,769 A | 11/2000 | Mohammadi et al. |
| 6,162,327 A | 12/2000 | Batra et al. |
| 6,162,329 A | 12/2000 | Vinson et al. |
| 6,187,138 B1 | 2/2001 | Neal et al. |
| 6,200,419 B1 | 3/2001 | Phan |
| 6,203,667 B1 | 3/2001 | Huhtelin |
| 6,207,734 B1 | 3/2001 | Vinson et al. |
| 6,231,723 B1 | 5/2001 | Kanitz et al. |
| 6,287,426 B1 | 9/2001 | Edwards et al. |
| 6,303,233 B1 | 10/2001 | Amon et al. |
| 6,319,362 B1 | 11/2001 | Huhtelin et al. |
| 6,344,111 B1 | 2/2002 | Wilhelm |
| 6,420,013 B1 | 7/2002 | Vinson et al. |
| 6,420,100 B1 | 7/2002 | Trokhan et al. |
| 6,423,184 B2 | 7/2002 | Vahatalo et al. |
| 6,458,246 B1 | 10/2002 | Kanitz et al. |
| 6,464,831 B1 | 10/2002 | Trokhan et al. |
| 6,473,670 B1 | 10/2002 | Huhtelin |
| 6,521,089 B1 | 2/2003 | Griech et al. |
| 6,537,407 B1 | 3/2003 | Law et al. |
| 6,547,928 B2 | 4/2003 | Barnholtz et al. |
| 6,551,453 B2 | 4/2003 | Weisman et al. |
| 6,551,691 B1 | 4/2003 | Hoeft et al. |
| 6,572,722 B1 | 6/2003 | Pratt |
| 6,579,416 B1 | 6/2003 | Vinson et al. |
| 6,602,454 B2 | 8/2003 | McGuire et al. |
| 6,607,637 B1 | 8/2003 | Vinson et al. |
| 6,610,173 B1 | 8/2003 | Lindsay et al. |
| 6,613,194 B2 | 9/2003 | Kanitz et al. |
| 6,660,362 B1 | 12/2003 | Lindsay et al. |
| 6,673,202 B2 | 1/2004 | Burazin |
| 6,701,637 B2 | 3/2004 | Lindsay et al. |
| 6,755,939 B2 | 6/2004 | Vinson et al. |
| 6,773,647 B2 | 8/2004 | McGuire et al. |
| 6,797,117 B1 | 9/2004 | McKay et al. |
| 6,808,599 B2 | 10/2004 | Burazin |
| 6,821,386 B2 | 11/2004 | Weisman et al. |
| 6,821,391 B2 | 11/2004 | Scherb et al. |
| 6,827,818 B2 | 12/2004 | Farrington, Jr. et al. |
| 6,863,777 B2 | 3/2005 | Kanitz et al. |
| 6,896,767 B2 | 5/2005 | Wilhelm |
| 6,939,443 B2 | 9/2005 | Ryan et al. |
| 6,998,017 B2 | 2/2006 | Lindsay et al. |
| 6,998,024 B2 | 2/2006 | Burazin |
| 7,005,043 B2 | 2/2006 | Toney et al. |
| 7,014,735 B2 | 3/2006 | Kramer et al. |
| 7,105,465 B2 | 9/2006 | Patel et al. |
| 7,155,876 B2 | 1/2007 | VanderTuin et al. |
| 7,157,389 B2 | 1/2007 | Branham et al. |
| 7,182,837 B2 | 2/2007 | Chen et al. |
| 7,194,788 B2 | 3/2007 | Clark et al. |
| 7,235,156 B2 | 6/2007 | Baggot |
| 7,269,929 B2 | 9/2007 | VanderTuin et al. |
| 7,294,230 B2 | 11/2007 | Flugge-Berendes et al. |
| 7,311,853 B2 | 12/2007 | Vinson et al. |
| 7,328,550 B2 | 2/2008 | Schoeneck |
| 7,339,378 B2 | 3/2008 | Han et al. |
| 7,351,307 B2 | 4/2008 | Scherb et al. |
| 7,387,706 B2 | 6/2008 | Herman et al. |
| 7,399,378 B2 | 7/2008 | Edwards et al. |
| 7,419,569 B2 | 9/2008 | Hermans |
| 7,427,434 B2 | 9/2008 | Busam |
| 7,431,801 B2 | 10/2008 | Conn et al. |
| 7,432,309 B2 | 10/2008 | Vinson |
| 7,442,278 B2 | 10/2008 | Murray et al. |
| 7,452,447 B2 | 11/2008 | Duan et al. |
| 7,476,293 B2 | 1/2009 | Herman et al. |
| 7,494,563 B2 | 2/2009 | Edwards et al. |
| 7,510,631 B2 | 3/2009 | Scherb et al. |
| 7,513,975 B2 | 4/2009 | Burma |
| 7,563,344 B2 | 7/2009 | Beuther |
| 7,582,187 B2 | 9/2009 | Scherb et al. |
| 7,611,607 B2 | 11/2009 | Mullally et al. |
| 7,622,020 B2 | 11/2009 | Awofeso |
| 7,662,462 B2 | 2/2010 | Noda |
| 7,670,678 B2 | 3/2010 | Phan |
| 7,683,126 B2 | 3/2010 | Neal et al. |
| 7,686,923 B2 | 3/2010 | Scherb et al. |
| 7,687,140 B2 | 3/2010 | Manifold et al. |
| 7,691,230 B2 | 4/2010 | Scherb et al. |
| 7,744,722 B1 | 6/2010 | Tucker et al. |
| 7,744,726 B2 | 6/2010 | Scherb et al. |
| 7,799,382 B2 | 9/2010 | Payne et al. |
| 7,811,418 B2 | 10/2010 | Klerelid et al. |
| 7,815,978 B2 | 10/2010 | Davenport et al. |
| 7,823,366 B2 | 11/2010 | Schoeneck |
| 7,842,183 B2 | 11/2010 | Nickel et al. |
| 7,867,361 B2 | 1/2011 | Salaam et al. |
| 7,871,692 B2 | 1/2011 | Morin et al. |
| 7,887,673 B2 | 2/2011 | Andersson et al. |
| 7,905,989 B2 | 3/2011 | Scherb et al. |
| 7,914,866 B2 | 3/2011 | Shannon et al. |
| D636,273 S | 4/2011 | Ver Kuilen |
| 7,931,781 B2 | 4/2011 | Scherb et al. |
| 7,951,269 B2 | 5/2011 | Herman et al. |
| 7,955,549 B2 | 6/2011 | Noda |
| 7,959,764 B2 | 6/2011 | Ringer et al. |
| 7,972,475 B2 | 7/2011 | Chan et al. |
| 7,989,058 B2 | 8/2011 | Manifold et al. |
| 8,034,463 B2 | 10/2011 | Leimbach et al. |
| 8,051,629 B2 | 11/2011 | Pazdernik et al. |
| 8,075,739 B2 | 12/2011 | Scherb et al. |
| 8,092,652 B2 | 1/2012 | Scherb et al. |
| 8,118,979 B2 | 2/2012 | Herman et al. |
| 8,147,649 B1 | 4/2012 | Tucker et al. |
| 8,152,959 B2 | 4/2012 | Elony et al. |
| 8,196,314 B2 | 6/2012 | Munch |
| 8,216,427 B2 | 7/2012 | Klerelid et al. |
| 8,236,135 B2 | 8/2012 | Prodoehl et al. |
| 8,303,773 B2 | 11/2012 | Scherb et al. |
| 8,382,956 B2 | 2/2013 | Boechat et al. |
| 8,402,673 B2 | 3/2013 | Da Silva et al. |
| 8,409,404 B2 | 4/2013 | Harper et al. |
| 8,435,384 B2 | 5/2013 | Da Silva et al. |
| 8,440,055 B2 | 5/2013 | Scherb et al. |
| 8,445,032 B2 | 5/2013 | Topolkaraev et al. |
| 8,454,800 B2 | 6/2013 | Mourad et al. |
| 8,470,133 B2 | 6/2013 | Cunnane et al. |
| 8,506,756 B2 | 8/2013 | Denis et al. |
| 8,544,184 B2 | 10/2013 | Da Silva et al. |
| 8,574,211 B2 | 11/2013 | Morita |
| 8,580,083 B2 | 11/2013 | Boechat et al. |
| 8,728,277 B2 | 5/2014 | Boechat et al. |
| 8,758,569 B2 | 6/2014 | Aberg et al. |
| 8,771,466 B2 | 7/2014 | Denis et al. |
| 8,801,903 B2 | 8/2014 | Mourad et al. |
| 8,815,057 B2 | 8/2014 | Eberhardt et al. |

(56) References Cited

U.S. PATENT DOCUMENTS

| | | |
|---|---|---|
| 8,822,009 B2 | 9/2014 | Riviere et al. |
| 8,968,517 B2 | 3/2015 | Ramaratnam et al. |
| 8,980,082 B2 | 3/2015 | Karlsson et al. |
| 9,005,710 B2 | 4/2015 | Jones et al. |
| D734,617 S | 7/2015 | Seitzinger et al. |
| 9,095,477 B2 | 8/2015 | Yamaguchi |
| D738,633 S | 9/2015 | Seitzinger et al. |
| 9,382,666 B2 | 7/2016 | Ramaratnam et al. |
| 9,506,203 B2 | 11/2016 | Ramaratnam et al. |
| 9,580,872 B2 | 2/2017 | Ramaratnam et al. |
| 9,702,089 B2 | 7/2017 | Ramaratnam et al. |
| 9,702,090 B2 | 7/2017 | Ramaratnam et al. |
| 9,719,213 B2 | 8/2017 | Miller, IV et al. |
| 9,725,853 B2 | 8/2017 | Ramaratnam et al. |
| 2001/0018068 A1 | 8/2001 | Lorenzi et al. |
| 2002/0028230 A1 | 3/2002 | Eichhorn et al. |
| 2002/0060049 A1 | 5/2002 | Kanitz et al. |
| 2002/0061386 A1 | 5/2002 | Carson et al. |
| 2002/0098317 A1 | 7/2002 | Jaschinski et al. |
| 2002/0110655 A1 | 8/2002 | Seth |
| 2002/0115194 A1 | 8/2002 | Lange et al. |
| 2002/0125606 A1 | 9/2002 | McGuire et al. |
| 2003/0024674 A1 | 2/2003 | Kanitz et al. |
| 2003/0056911 A1 | 3/2003 | Hermans et al. |
| 2003/0056917 A1 | 3/2003 | Jimenez |
| 2003/0070781 A1 | 4/2003 | Hermans et al. |
| 2003/0114071 A1 | 6/2003 | Everhart et al. |
| 2003/0159401 A1 | 8/2003 | Sorenson et al. |
| 2003/0188843 A1 | 10/2003 | Kanitz et al. |
| 2003/0218274 A1 | 11/2003 | Boutilier et al. |
| 2003/0230051 A1 | 12/2003 | Tinti |
| 2004/0118531 A1 | 6/2004 | Shannon et al. |
| 2004/0123963 A1 | 7/2004 | Chen et al. |
| 2004/0126601 A1 | 7/2004 | Kramer et al. |
| 2004/0126710 A1 | 7/2004 | Hill et al. |
| 2004/0168784 A1 | 9/2004 | Duan et al. |
| 2004/0173333 A1 | 9/2004 | Hermans et al. |
| 2004/0200752 A1 | 10/2004 | Poli |
| 2004/0234804 A1 | 11/2004 | Liu et al. |
| 2005/0016704 A1 | 1/2005 | Huhtelin |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0112115 A1 | 5/2005 | Khan |
| 2005/0123726 A1 | 6/2005 | Broering et al. |
| 2005/0130536 A1 | 6/2005 | Siebers et al. |
| 2005/0136222 A1 | 6/2005 | Hada et al. |
| 2005/0148257 A1 | 7/2005 | Hermans et al. |
| 2005/0150626 A1 | 7/2005 | Kanitz et al. |
| 2005/0166551 A1 | 8/2005 | Keane et al. |
| 2005/0241786 A1 | 11/2005 | Edwards et al. |
| 2005/0241788 A1 | 11/2005 | Baggot et al. |
| 2005/0252626 A1 | 11/2005 | Chen et al. |
| 2005/0280184 A1 | 12/2005 | Sayers et al. |
| 2005/0287340 A1 | 12/2005 | Morelli et al. |
| 2006/0005916 A1 | 1/2006 | Stelljes et al. |
| 2006/0013998 A1 | 1/2006 | Stelljes et al. |
| 2006/0019567 A1 | 1/2006 | Sayers |
| 2006/0083899 A1 | 4/2006 | Burazin et al. |
| 2006/0093788 A1 | 5/2006 | Behm et al. |
| 2006/0113049 A1 | 6/2006 | Knobloch et al. |
| 2006/0130986 A1 | 6/2006 | Flugge-Berendes et al. |
| 2006/0194022 A1 | 8/2006 | Boutilier et al. |
| 2006/0269706 A1 | 11/2006 | Shannon et al. |
| 2007/0020315 A1 | 1/2007 | Shannon et al. |
| 2007/0045456 A1* | 3/2007 | Medoff ............... B29C 45/0005 241/24.29 |
| 2007/0131366 A1 | 6/2007 | Underhill et al. |
| 2007/0137813 A1 | 6/2007 | Nickel et al. |
| 2007/0137814 A1 | 6/2007 | Gao |
| 2007/0170610 A1 | 7/2007 | Payne et al. |
| 2007/0240842 A1 | 10/2007 | Scherb et al. |
| 2007/0251659 A1 | 11/2007 | Fernandes et al. |
| 2007/0251660 A1 | 11/2007 | Walkenhaus et al. |
| 2007/0267157 A1 | 11/2007 | Kanitz et al. |
| 2007/0272381 A1 | 11/2007 | Bony et al. |
| 2007/0275866 A1 | 11/2007 | Dykstra |
| 2007/0298221 A1 | 12/2007 | Vinson |
| 2008/0035289 A1 | 2/2008 | Howards et al. |
| 2008/0076695 A1 | 3/2008 | Uitenbroek et al. |
| 2008/0078685 A1* | 4/2008 | Patterson ............... B65D 85/07 206/391 |
| 2008/0156450 A1 | 7/2008 | Klerelid et al. |
| 2008/0199655 A1 | 8/2008 | Monnerie et al. |
| 2008/0245491 A1* | 10/2008 | Knobloch ............ D21H 27/002 206/391 |
| 2008/0245498 A1 | 10/2008 | Ostendorf et al. |
| 2008/0302493 A1 | 12/2008 | Boatman et al. |
| 2008/0308247 A1 | 12/2008 | Ringer et al. |
| 2009/0020248 A1 | 1/2009 | Sumnicht et al. |
| 2009/0056892 A1 | 3/2009 | Rekoske |
| 2009/0061709 A1 | 3/2009 | Nakai et al. |
| 2009/0205797 A1 | 8/2009 | Fernandes et al. |
| 2009/0208717 A1* | 8/2009 | Enzinger ............... B29C 55/023 428/339 |
| 2009/0218058 A1 | 9/2009 | Manifold et al. |
| 2010/0065234 A1 | 3/2010 | Klerelid et al. |
| 2010/0119779 A1 | 5/2010 | Ostendorf et al. |
| 2010/0224338 A1 | 9/2010 | Harper et al. |
| 2010/0230064 A1 | 9/2010 | Eagles et al. |
| 2010/0236034 A1 | 9/2010 | Eagles et al. |
| 2010/0239825 A1 | 9/2010 | Sheehan et al. |
| 2010/0272965 A1 | 10/2010 | Schinkoreit et al. |
| 2011/0027545 A1 | 2/2011 | Harlacher et al. |
| 2011/0180223 A1 | 7/2011 | Klerelid et al. |
| 2011/0189435 A1 | 8/2011 | Manifold et al. |
| 2011/0189442 A1 | 8/2011 | Manifold et al. |
| 2011/0206913 A1 | 8/2011 | Manifold et al. |
| 2011/0223381 A1 | 9/2011 | Sauter et al. |
| 2011/0253329 A1 | 10/2011 | Manifold et al. |
| 2011/0265967 A1 | 11/2011 | Van Phan |
| 2011/0303379 A1 | 12/2011 | Boechat et al. |
| 2012/0144611 A1 | 6/2012 | Baker et al. |
| 2012/0152475 A1 | 6/2012 | Edwards et al. |
| 2012/0177888 A1 | 7/2012 | Escafere et al. |
| 2012/0205272 A1* | 8/2012 | Heilman ............... B65D 75/38 206/391 |
| 2012/0244241 A1 | 9/2012 | McNeil |
| 2012/0267063 A1 | 10/2012 | Klerelid et al. |
| 2012/0297560 A1 | 11/2012 | Zwick et al. |
| 2013/0008135 A1 | 1/2013 | Moore et al. |
| 2013/0029105 A1 | 1/2013 | Miller et al. |
| 2013/0029106 A1 | 1/2013 | Lee et al. |
| 2013/0067861 A1* | 3/2013 | Turner ............... B65D 75/006 53/473 |
| 2013/0133851 A1 | 5/2013 | Boechat et al. |
| 2013/0150817 A1 | 6/2013 | Kainth et al. |
| 2013/0160960 A1 | 6/2013 | Hermans et al. |
| 2013/0209749 A1 | 8/2013 | Myangiro et al. |
| 2013/0248129 A1 | 9/2013 | Manifold et al. |
| 2013/0327487 A1 | 12/2013 | Espinosa et al. |
| 2014/0004307 A1 | 1/2014 | Sheehan |
| 2014/0041820 A1 | 2/2014 | Ramaratnam et al. |
| 2014/0041822 A1 | 2/2014 | Boechat et al. |
| 2014/0050890 A1 | 2/2014 | Zwick et al. |
| 2014/0053994 A1 | 2/2014 | Manifold et al. |
| 2014/0096924 A1 | 4/2014 | Rekokske et al. |
| 2014/0182798 A1 | 7/2014 | Polat et al. |
| 2014/0242320 A1 | 8/2014 | McNeil et al. |
| 2014/0272269 A1 | 9/2014 | Hansen |
| 2014/0272747 A1 | 9/2014 | Ciurkot |
| 2014/0284237 A1 | 9/2014 | Gosset |
| 2014/0360519 A1 | 12/2014 | George et al. |
| 2015/0059995 A1 | 3/2015 | Ramaratnam et al. |
| 2015/0102526 A1 | 4/2015 | Ward et al. |
| 2015/0129145 A1 | 5/2015 | Chou et al. |
| 2015/0211179 A1 | 7/2015 | Alias et al. |
| 2015/0241788 A1 | 8/2015 | Yamaguchi |
| 2015/0330029 A1 | 11/2015 | Ramaratnam et al. |
| 2016/0060811 A1 | 3/2016 | Riding et al. |
| 2016/0090692 A1 | 3/2016 | Eagles et al. |
| 2016/0090693 A1 | 3/2016 | Eagles et al. |
| 2016/0130762 A1 | 5/2016 | Ramaratnam et al. |
| 2016/0137398 A1 | 5/2016 | Lemke et al. |

(56) References Cited

U.S. PATENT DOCUMENTS

| | | |
|---|---|---|
| 2016/0145810 A1 | 5/2016 | Miller, IV et al. |
| 2016/0159007 A1 | 6/2016 | Miller, IV et al. |
| 2016/0160448 A1 | 6/2016 | Miller, IV et al. |
| 2016/0185041 A1 | 6/2016 | Topolkaraev et al. |
| 2016/0185050 A1 | 6/2016 | Topolkaraev et al. |
| 2016/0273168 A1 | 9/2016 | Ramaratnam et al. |
| 2016/0273169 A1 | 9/2016 | Ramaratnam et al. |
| 2016/0289897 A1 | 10/2016 | Ramaratnam et al. |
| 2016/0289898 A1 | 10/2016 | Ramaratnam et al. |
| 2017/0044717 A1 | 2/2017 | Quigley |
| 2017/0101741 A1 | 4/2017 | Sealey et al. |
| 2017/0167082 A1 | 6/2017 | Ramaratnam et al. |
| 2017/0210103 A1* | 7/2017 | Hausmann ............... B65B 53/02 |
| 2017/0226698 A1 | 8/2017 | Lebrun et al. |
| 2017/0233946 A1 | 8/2017 | Sealey et al. |
| 2017/0253422 A1* | 9/2017 | Anklam ................. B65B 9/067 |
| 2017/0268178 A1 | 9/2017 | Ramaratnam et al. |

FOREIGN PATENT DOCUMENTS

| | | |
|---|---|---|
| CN | 1138356 A | 12/1996 |
| CN | 1207149 A | 2/1999 |
| CN | 1244899 A | 2/2000 |
| CN | 1268559 A | 10/2000 |
| CN | 1377405 A | 10/2002 |
| CN | 2728254 Y | 9/2005 |
| DE | 4242539 A1 | 8/1993 |
| EP | 0097036 A2 | 12/1983 |
| EP | 0979895 A1 | 2/2000 |
| EP | 1911574 A1 | 1/2007 |
| EP | 1339915 B1 | 7/2007 |
| EP | 2123826 A2 | 5/2009 |
| GB | 946093 A | 1/1964 |
| JP | 2013208298 A | 10/2013 |
| JP | 2014213138 A | 11/2014 |
| WO | 96/06223 A1 | 2/1996 |
| WO | 200382550 A2 | 10/2003 |
| WO | 200445834 A1 | 6/2004 |
| WO | 2007070145 A1 | 6/2007 |
| WO | 2008019702 A1 | 2/2008 |
| WO | 2009006709 A1 | 1/2009 |
| WO | 2009/061079 A1 | 5/2009 |
| WO | 2009067079 A1 | 5/2009 |
| WO | 2011028823 A1 | 3/2011 |
| WO | 2012003360 A2 | 1/2012 |
| WO | 2013024297 A1 | 2/2013 |
| WO | 2013136471 A1 | 9/2013 |
| WO | 2014/022848 A1 | 2/2014 |
| WO | 201500755 A1 | 1/2015 |
| WO | 2015/176063 A1 | 11/2015 |
| WO | 2016/077594 A1 | 5/2016 |
| WO | 2016/086019 A1 | 6/2016 |
| WO | 2016/090242 A1 | 6/2016 |
| WO | 2016/090364 A1 | 6/2016 |
| WO | 2016085704 A1 | 8/2016 |
| WO | 2017066465 A1 | 4/2017 |
| WO | 2017066656 A1 | 4/2017 |
| WO | 2017139786 A1 | 8/2017 |

\* cited by examiner

BUNDLED PRODUCT AND SYSTEM AND METHOD FOR FORMING THE SAME

RELATED APPLICATIONS

This application is a continuation-in-part of and claims priority to and the benefit of U.S. patent application Ser. No. 16/445,598, filed Jun. 19, 2019 and entitled BUNDLED PRODUCT AND SYSTEM AND METHOD FOR FORMING THE SAME, which in turn claims priority to and the benefit of U.S. Provisional Patent Application No. 62/688,207, filed Jun. 21, 2018 and entitled BUNDLED PRODUCT AND SYSTEM AND METHOD FOR FORMING THE SAME, and the contents of these applications are incorporated herein by reference in their entirety.

FIELD OF THE INVENTION

The present invention generally relates to packaging of items in a film material, and in particular to systems and methods for packaging groups of items within a film material.

BACKGROUND

It is known to package rolls of paper products, such as tissue and paper towel rolls, in bundles wrapped in packaging material. It is important for such packaged bundles to have a streamlined profile so as to minimize the amount of space required for storage and shipping of the bundles and also so that any loose packaging material on the bundles do not interfere with machinery during sorting and shipping.

FIG. 9 is a perspective view of a conventional bundle of paper product rolls, generally designated by reference number 3000. The bundle 3000 includes open side gussets 3010 that are formed during the packaging process. These side gussets 3010 may get caught in machinery during shipping and delivery of the bundle 3000, contributing to delays and expense in the overall bundle production and shipping process.

SUMMARY OF THE INVENTION

A direct-to-consumer heat shrunk bundled product according to an exemplary embodiment of the present invention comprises: a plurality of paper product rolls each individually packaged by a first package material and arranged relative to one another so as to form a bundle, the bundle being packaged by a second package material, wherein an entire inner surface of the second package material is exposed to the first package material of the plurality of paper product rolls and is nonstick relative to the first package material. As used herein, "direct-to-consumer" means product delivered from the manufacturer to consumers by shipping individual bundles non-palletized via the last mile or retail tissue products shipped directly to consumers. As known in the art, the term "last mile" refers to the final step of the delivery process from a distribution center or facility to the end user, and can involve a distance from a few blocks to 50 or 100 miles, or even more.

A direct-to-consumer heat shrunk bundled product according to an exemplary embodiment of the present invention comprises: a plurality of paper product rolls each individually packaged by a first package material and arranged relative to one another so as to form a bundle, the bundle being packaged by a wrapper made of a second package material, wherein the wrapper comprises at least one end seal that comprises: a middle portion made up of two overlapping layers of the second package material; and side portions made up of at least three overlapping layers of the second package material that are fused to one another so that there are no openings between the at least three overlapping layers.

A direct-to-consumer heat shrunk bundled product according to an exemplary embodiment of the present invention comprises: a plurality of tissue product rolls arranged in groups with each group individually packaged by a first package material and arranged relative to one another so as to form a bundle, the bundle being packaged by a second package material, wherein each tissue product roll has a Kershaw firmness of 3.5 mm or more and the packaged bundle deflects less than 6 inches under a 150 lb force as tested in accordance with ASTM D 642 where the force was applied perpendicular to a longest side of the bundle.

A direct-to-consumer heat shrunk bundled product according to an exemplary embodiment of the present invention comprises: a plurality of paper towel product rolls each individually packaged by a first package material and arranged relative to one another so as to form a bundle, the bundle being packaged by a second package material, wherein each tissue product roll has a Kershaw firmness of 6.0 mm and the packaged bundle deflects less than 7 inches under a 150 lb force as tested in accordance with ASTM D 642 where the force was applied perpendicular to a longest side of the bundle.

A method of forming a direct-to-consumer heat shrunk bundled product according to an exemplary embodiment of the present invention comprises: individually packaging a plurality of paper product rolls with a first packaging material so as to form a bundle; packaging the bundle with a wrapper made of a second packaging material so as to form a packaged bundle; subjecting the packaged bundle to heat treatment within a heated tunnel, a temperature of the heat treatment applied by the heated tunnel is 300-400° F. and heat is applied to the packaged bundle for 20 to 45 seconds; and applying force to sides of the packaged bundle after heat treatment so as to fuse folded portions of the second packaging material together.

These and other features and advantages of the present invention will be presented in more detail in the following detailed description and the accompanying figures which illustrate by way of example principles of the invention.

DESCRIPTION OF THE DRAWINGS

Various exemplary embodiments of this invention will be described in detail, with reference to the following figures, wherein.

DETAILED DESCRIPTION

The present invention is directed to the packaging of sheet products within a film material, and in particular is directed to a packaged bundle of sheet products that has enhanced properties for effective and efficient shipping. In embodiments, the packaged bundle includes an outer layer of film material (i.e., "wrapper") that is shrink wrapped through a heat treatment process around an inner layer of film material. In embodiments, as the packaged bundle is conveyed through a heated tunnel as part of the heat treatment process, the bundle is specifically positioned within the heated tunnel and subjected to side pressure from rollers so as to form a unitary folded seam that extends outwardly relative to the plane of the outer film material. This differs from conventional bundles that may have gusset seals made up of separate layers of film material (i.e., not unitary relative to one another) that protrude outwardly from the bundle, which create openings in the bundle that may catch on machinery during bundle transport.

The term "sheet products" as used herein is inclusive of natural and/or synthetic cloth or paper sheets. Sheet products may include both woven and non-woven articles. There is a wide variety of nonwoven processes and these processes can be, for example, either wetlaid or drylaid. Some examples include hydroentangled (sometimes called spunlace), DRC (double re-creped), airlaid, spunbond, carded, paper towel, and meltblown sheet products. Further, sheet products may contain fibrous cellulosic materials that may be derived from natural sources, such as wood pulp fibers, as well as other fibrous material characterized by having hydroxyl groups attached to the polymer backbone. These include glass fibers and synthetic fibers modified with hydroxyl groups. Examples of sheet products include, but are not limited to, wipes, napkins, tissues, rolls, towels or other fibrous, film, polymer, or filamentary products.

In general, sheet products are thin in comparison to their length and breadth and exhibit a relatively flat planar configuration and are flexible to permit folding, rolling, stacking, and the like. The sheet product may have perforations extending in lines across its width to separate individual sheets and to facilitate separation or tearing of individual sheets from a roll or folded arrangement at discrete intervals. Individual sheets may be sized as desired to accommodate the many uses of the sheet products. For example, perforation lines may be formed every thirteen inches, or other defined interval, to define a universally sized sheet. Multiple perforation lines may be provided to allow the user to select the size of the sheet depending on the particular need.

Figure 1:
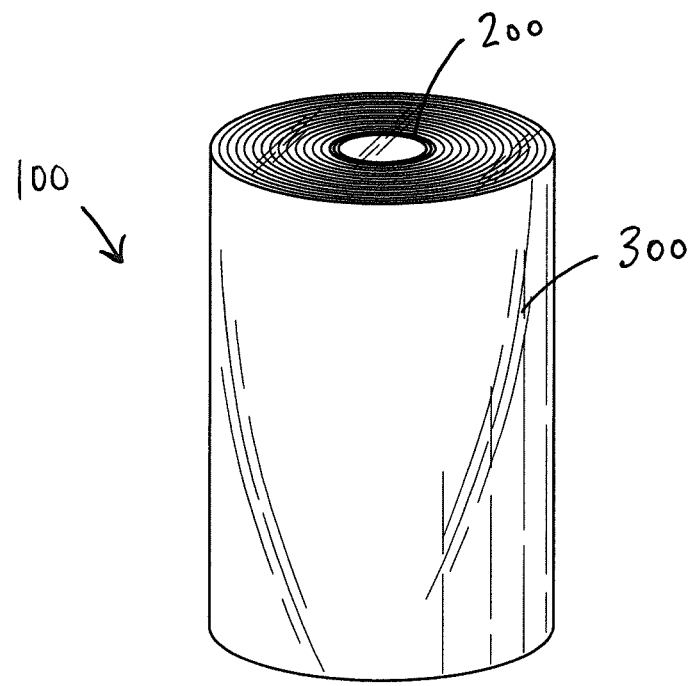
FIG. 1 is a perspective view of a paper product roll according to an exemplary embodiment of the present invention.

FIG. 1 illustrates a roll sheet product (roll) 100 according to an exemplary embodiment of the present invention. The roll of sheet product 100 may include a cylindrical core 200 in the center of the roll 100. The roll 100 itself may be composed of a single roll of sheet material as shown, or alternatively may be made of rolls stacked on-end. In the embodiment shown in FIG. 1, the roll 100 has been wrapped in a protective cover or inner packaging material 300. The inner packaging material 300 may be any suitable material such as, for example, a plastic film or a fibrous sheet product. Suitable plastics include, but are not limited to polyalkanes, polyalkenes, polyesters, polyamides, polyvinyl chloride, blends thereof and copolymers thereof. The plastics may be straight chained, branched and/or block copolymers. In exemplary embodiments, the inner packaging material 300 is made of polyethylene, polylactic acid (PLA), polypropylene, regenerated cellulose, and/or nylon. The polyethylene may be a mixture of high density polyethylene and low density polyethylene. When high density polyethylene is used, the amount may range from about 1% to about 20% or from about 5% to about 15% or from about 8% to about 12% by weight, based on the total weight of the packaging material. The inner packaging material 300 may be transparent, translucent, or opaque and may include graphics or text printed on the inner packaging material 300. It should be appreciated that in other exemplary embodiments any number of rolls (either individually wrapped or un-wrapped) may be packaged in a respective protective cover (for example, three rolls arranged in-line and packaged within a single protective cover) to form groups of packaged rolls, and the complete bundle may include any number of packaged groups of rolls with any number of rolls in each group.

Figure 2:
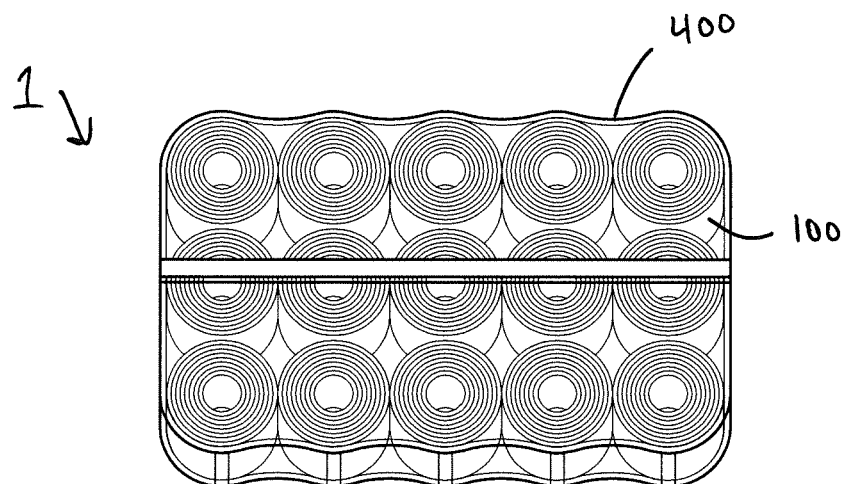
FIG. 2 is a perspective view of a paper product roll bundle according to an exemplary embodiment of the present invention.

FIG. 2 illustrates an arrangement of rolls 100 that has been wrapped in an outer packaging or wrapper 400 so as to form a bundle, generally designated by reference number 1, according to an exemplary embodiment of the present invention. The wrapper 400 envelopes the rolls 100. The wrapper 400 is formed from a plastic material that may be heated to shrink the wrapper 400 around the rolls 100. Suitable plastics include, but are not limited to, polyalkanes, polyalkenes, polyesters, polyamides, polyvinyl chloride, blends thereof and copolymers thereof. The plastics may be straight chained, branched and/or block copolymers. The wrapper 400 may be formed from, for example, a tubular shaped plastic material that is arranged about the rolls 100. The wrapper 400 may be transparent or translucent and may, or may not, include graphic or textual markings printed on the wrapper 400. In an exemplary embodiment, the wrapper 400 has a thickness that is less than 1.8 mil, or from about 0.8 to about 1.6 mm, or from about 1.0 to about 1.4 mm, or from about 1.1 to about 1.3 mm as measured using Test Method ASTM D6988-13.

Figure 3:
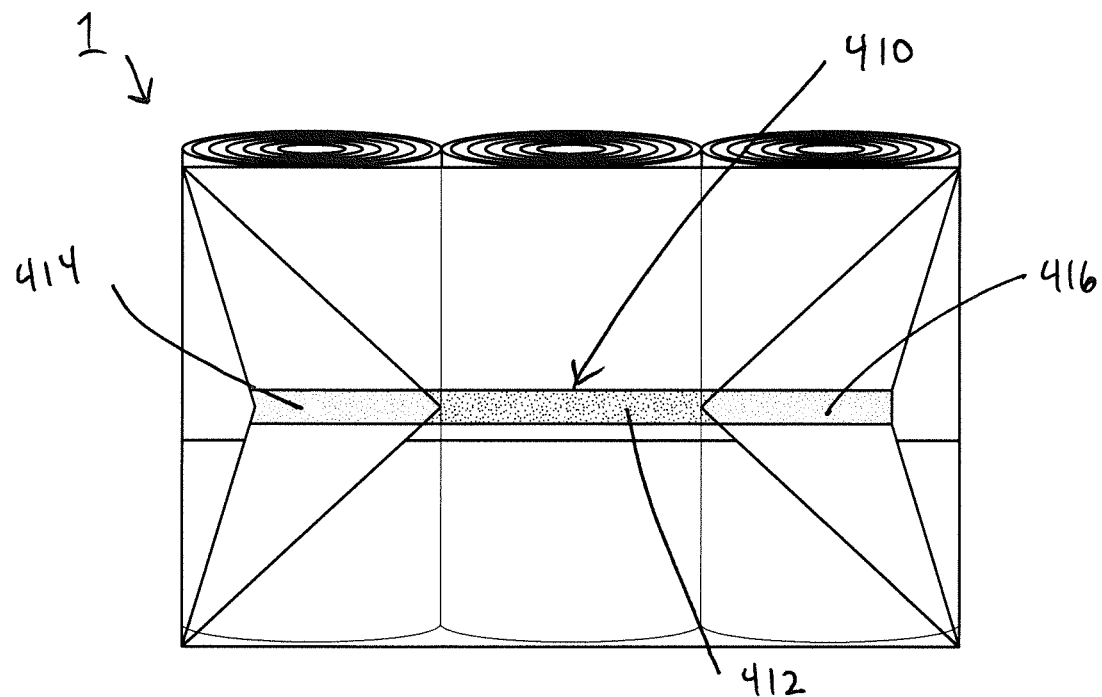
FIG. 3 is a side view of a paper product roll bundle according to an exemplary embodiment of the present invention.

The wrapper 400 is folded and sealed around the rolls 100 in the bundle 1 by a packaging machine, such as, for example, wrapper and bundle machines as disclosed in U.S. Patent Application Publication No. 2017/0253422 and U.S. Pat. No. 4,430,844, the contents of which are incorporated herein by reference in their entirety. The packaging process results in formation of seals around the wrapper, including a longitudinally extending lap seal 408 formed by overlapping ends of the wrapper material. In accordance with an exemplary embodiment, the outer packaging material extending between bundles along the packaging line is cut and then folded and sealed to form end seals at both ends of the bundle. In an exemplary embodiment, the end seals may be formed by an envelope-type fold, in which the cut ends of the packaging material are tucked inwards and folded over to form inwards-pointing triangular folds. FIG. 3 shows one end seal, generally designated by reference number 410, of the bundle 1 according to an exemplary embodiment of the present invention. The end seal 410 extends transverse to the longitudinal axis of the rolls 100. The folding and sealing operation results in the end seal 410 with a center portion 412, a first outer portion 414 extending from the center portion 412 outwards along a first direction and a second outer portion 416 extending from the center portion 412 outwards along a second direction opposite to the first direction. The center portion 412 of the end seal 410 is made up of two layers of overlapping packaging material, while the first and second outer portions 414, 416 are made up of three layers of overlapping packaging material.

Figure 4:
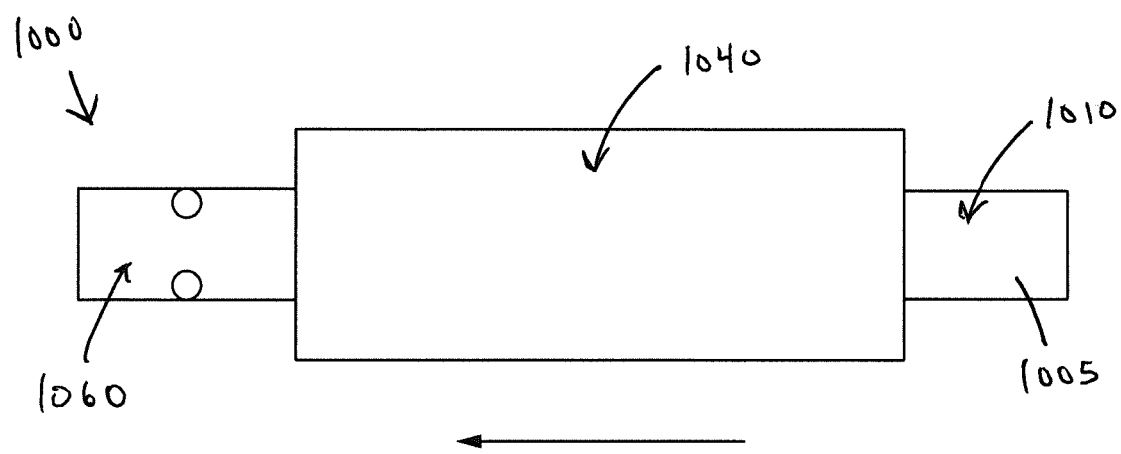
FIG. 4 is a block diagram of a heat tunnel assembly according to an exemplary embodiment of the present invention.

In accordance with an exemplary embodiment of the invention, the sealed bundles are conveyed through a heat tunnel in order to shrink the wrapper 400 around the rolls 100. In this regard, FIG. 4 is a block diagram of a heat tunnel assembly, generally designated by reference number 1000, according to an exemplary embodiment. The heat tunnel assembly 1000 includes infeed system 1010, heat tunnel 1040 and outfeed system 1060. As indicated by the left-pointed arrow in FIG. 4, the bundle 1 (after the wrapper 400 is folded and sealed) proceeds through the heat tunnel assembly 1000 along a conveyor 1005 first into the infeed system 1010, then through the heat tunnel 1040 and then out of the heat tunnel assembly 1000 at the outfeed system 1060. As explained in more detail below, the heat tunnel assembly 1000 includes components that maintain the bundles 1 within the center of the heat tunnel conveyor and that apply pressure to sides of the bundles 1 at the outfeed system 1060 to form folded unitary side seals.

Figure 5:
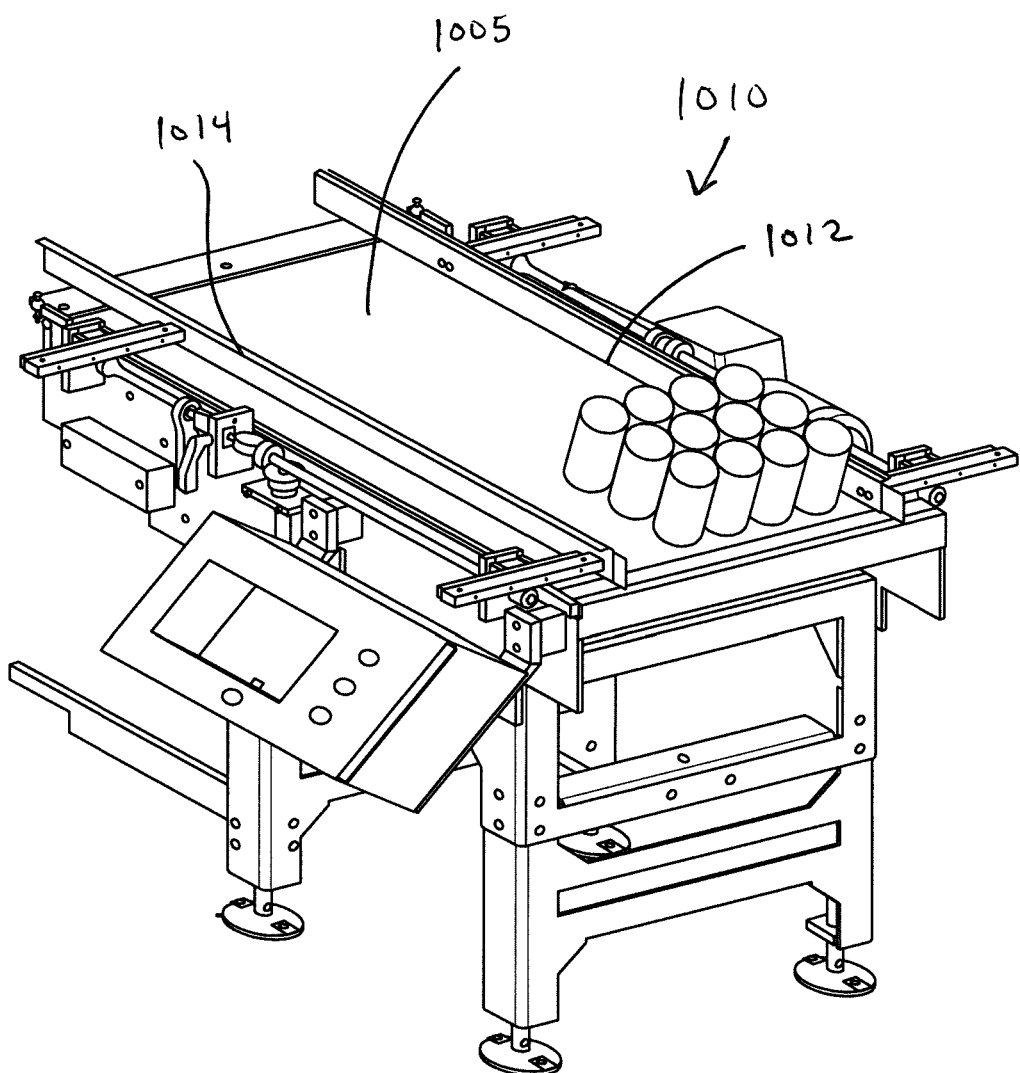
FIG. 5 is a perspective view of an infeed system according to an exemplary embodiment of the present invention.

FIG. 5 is a perspective view of the infeed system 1010 according to an exemplary embodiment of the present invention. The infeed system 1010 includes guide rails 1012, 1014 at opposite sides of the conveyor 1005. The positions of the guide rails 1012, 1014 may be adjustable so that the space between the guide rails 1012, 1014 conform to the width of different sized bundles. The guide rails 1012, 1014 are preferably equidistant from the center line of the conveyor 1005 so that the bundles 1 are guided along the center line of the conveyor 1005 as they are conveyed into the heat tunnel 1040. Positional adjustment of the guide rails 1012, 1014 may be achieved using, for example, lead screws, ball screws, roller screws, hydraulics, pneumatics, gear trains, electromagnetic actuators, and/or piezoelectric actuators.

The heat tunnel 1040 may be any commercially available heat tunnel, such as a S30 shrink wrapper available from Douglas Machine Inc., Alexandria, Minn. In general, heat tunnels apply heated air to articles enclosed in shrink wrap film, and are composed of at least one air supply unit, a conveyor and a heat shroud. Multiple air supply units can be provided along the conveyor to create a heat tunnel of desired length. An exemplary heat tunnel is described in U.S. Pat. No. 7,155,876, the contents of which are incorporated herein by reference in their entirety.

Figure 6:
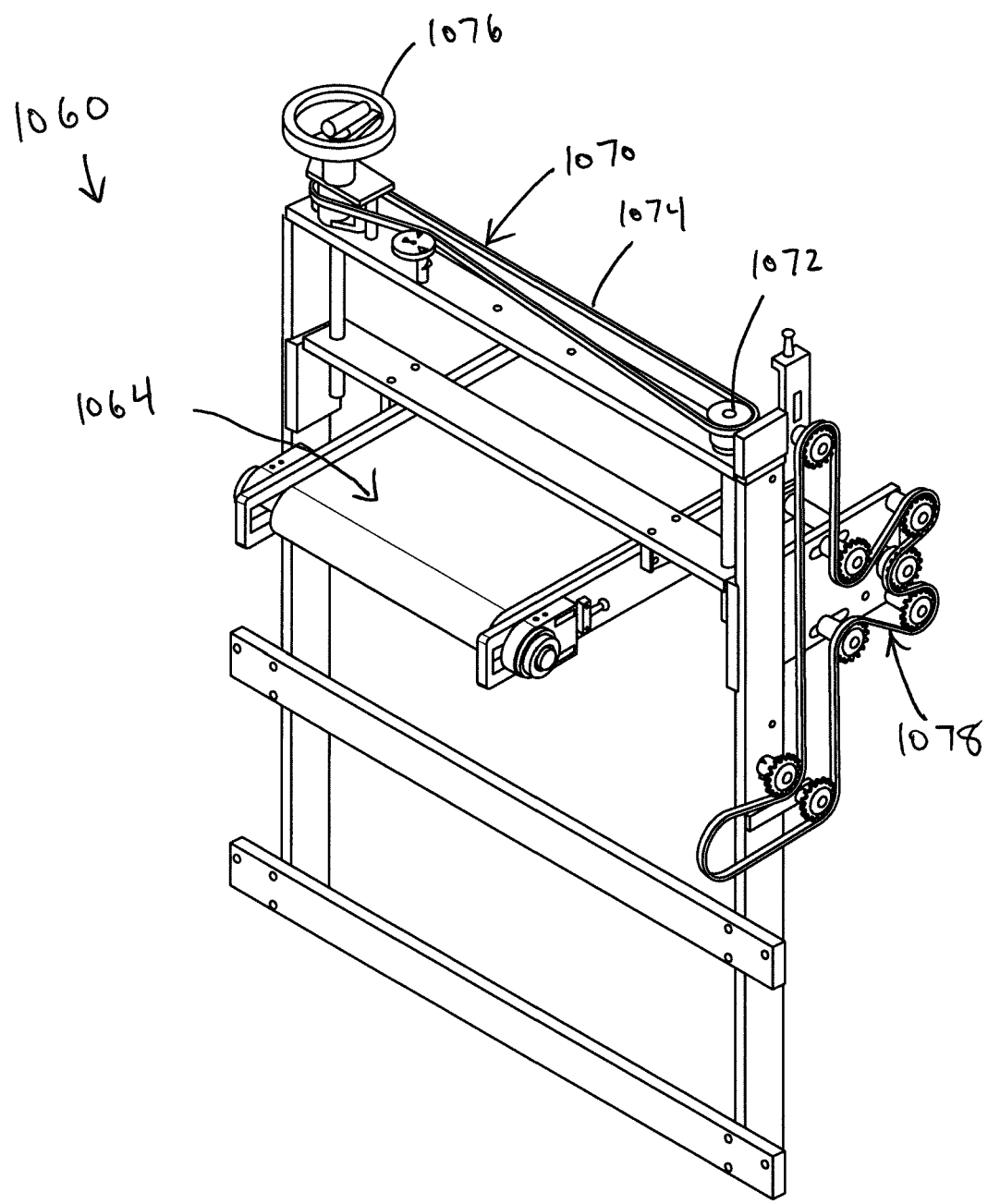
FIG. 6 is a perspective view of an outfeed system according to an exemplary embodiment of the present invention.

FIG. 6 is a perspective view of the outfeed system 1060 according to an exemplary embodiment of the present invention. The outfeed system 1060 assists in pulling the bundles 1 out of the heat tunnel 1040. In this regard, the outfeed system includes a top belt 1064, top belt height adjustment assembly 1070 and a drive chain assembly 1078. The top height adjustment assembly 1070 includes a height adjustment screw 1072 that may be operatively attached by a mechanical linkage to a user adjustable mechanism.

Although FIG. 6 shows the mechanical linkage as a belt 1074 and the user adjustable mechanism as a hand wheel 1076, it should be appreciated that any other suitable mechanisms may be used. These components of the outfeed system 1060 allow for adjustment to the height position of the top belt 1064 to accommodate different sized bundles. The drive chain assembly 1078 transmits mechanical power from a motor (e.g., an electric motor) to propel the top belt 1064 forward. In an exemplary embodiment, the top belt 1064 is mechanically linked to operate at the same speed as the conveyor 1005.

Figure 7:
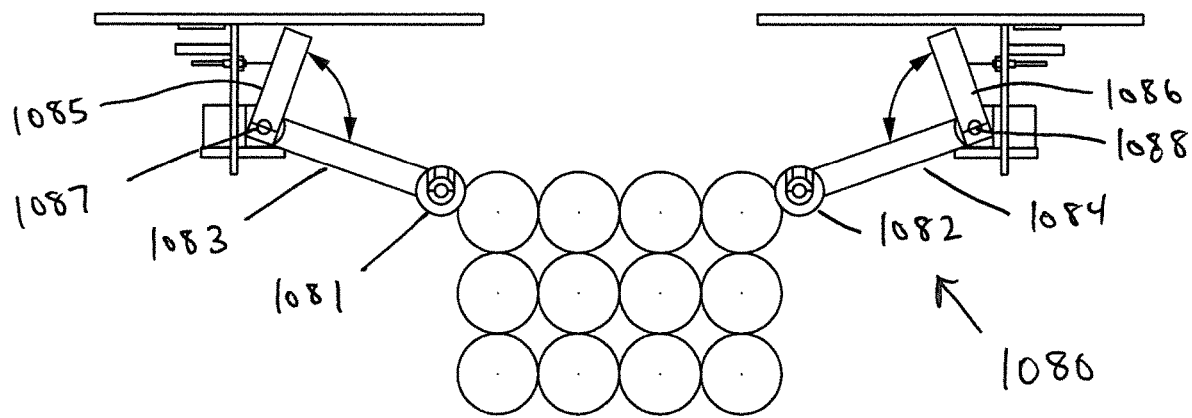
FIG. 7 is a top plan view of a roller assembly according to an exemplary embodiment of the present invention.

As shown in FIG. 7, the outfeed system 1060 further includes a roller assembly, generally designated by reference number 1080. The roller assembly 1080 includes a first roller 1081 positioned at one side of the conveyor 1005 and a second roller 1082 positioned at an opposite side of the conveyor 1005. The positions of the rollers 1081, 1082 relative to the center line of the conveyor 1005 may be adjusted so that the rollers 1081, 1082 apply pressure to sides of the bundles 1 as they pass between the rollers 1081, 1082. In this regard, the rollers 1081, 1082 may be operatively attached to the ends of respective first arms 1083, 1084, which in turn are fixed at a 90° angle with respective second arms 1085, 1086 at respective pivot points 1087, 1088. Application of pressure by the rollers 1081, 1082 to the sides of the bundle 1 occurs when the wrapper 400 and the inner packaging material 300 are in an at least partially molten state. This results in fusing of the layers of packaging material along the sides of the bundle 1 at the points where the rollers 1081, 1082 exert pressure, thereby forming a unitary three (or five) layer structure. In an exemplary embodiment, the unitary layered structure creates portions of the bundle 1 that extend outwards by an amount of, for example, less than 5 mm or less than 4 mm.

By way of further explanation, the rollers 1081, 1082 are located directly outside the exit of the heat tunnel. The rollers 1081, 1082 obtain heat discharged from the heat tunnel so that, in an exemplary embodiment, the rollers are heated to a temperature of about 120 degrees F. As the bundle moves out of the tunnel, the top belt 1064 (running at the same speed as the conveyor inside the heat tunnel) grabs the bundle 1 and provides positive traction through the roller assembly 1080. The rollers 1081, 1082 are mechanically attached to arms to which are attached spring shocks. The spring shocks/tensioners force the rollers 1081, 1082 towards the inside of the tunnel and into contact with the bundle 1. As the bundle 1 travels by way of the top belt 1064 and exits conveyor, the rollers 1081, 1082 make contact with the ends of the bundle 1, thereby applying pressure to the still molten wrapper material to fuse the layers together to create the unitary seal structure (i.e., the previously opened gussets are sealed closed).

Figure 14A:
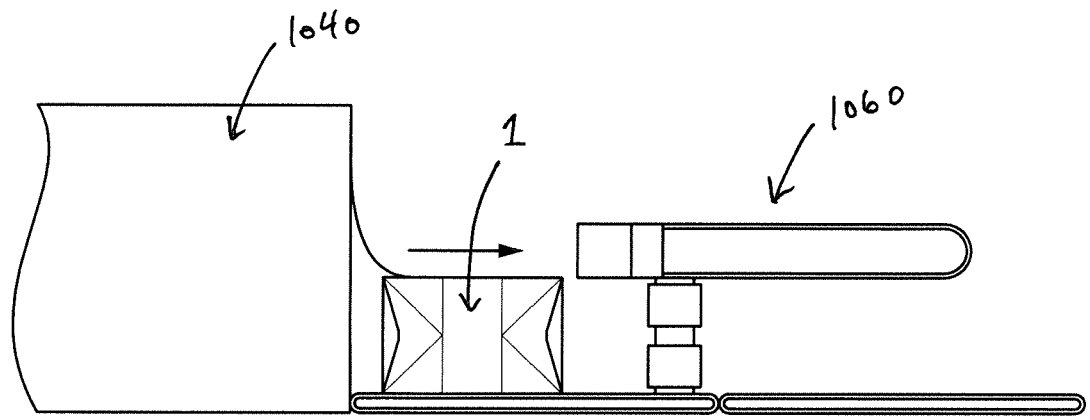
FIGS. 14A-14C are side views showing a bundle being conveyed through a heat tunnel assembly according to an exemplary embodiment of the present invention.
Figure 14B:
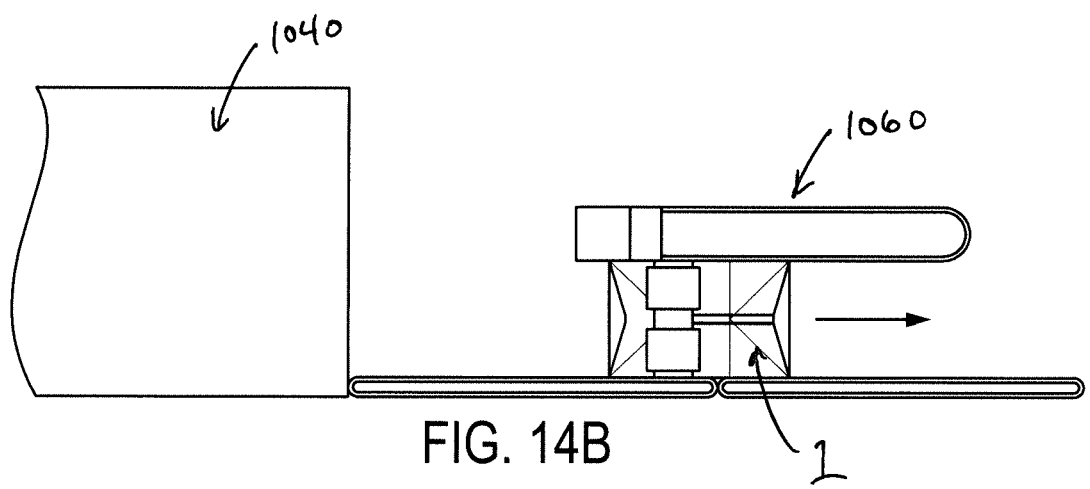
Figure 14C:
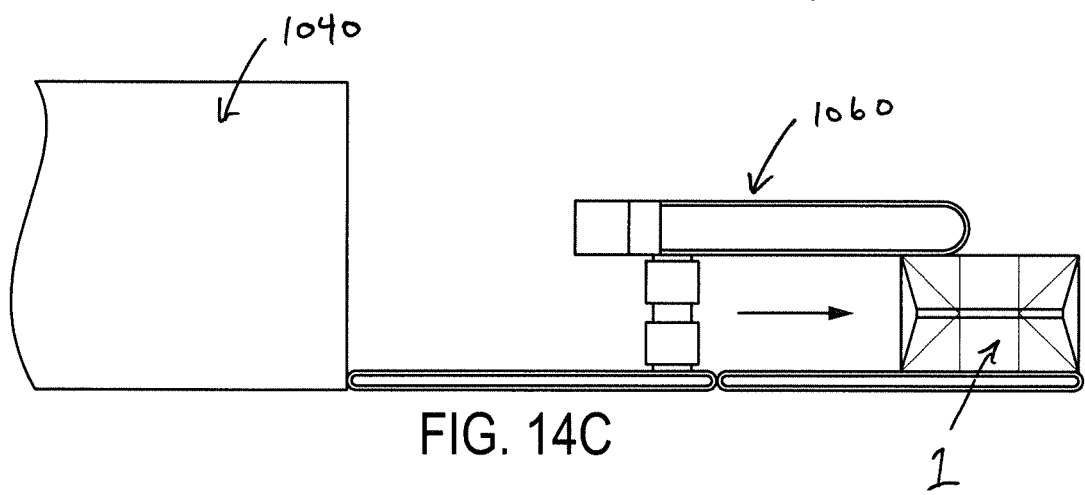

Reference is now made to FIGS. 14A-14C, which shows the bundle 1 as it exits the heat tunnel 1040 and proceeds through the outfeed system 1060. As shown in the these figures, the bundle 1 is arranged on the conveyor 1005 with the short sides of the bundle 1 (the sides of the bundle 1 with the end seals 410) facing towards the sides of the conveyor 1005, with the long sides (the sides of the bundle 1 without the end seals 410) facing forwards and backwards, respectfully, relative to the movement direction of the bundle 1. This puts the end seals 410 of the bundle 1 in contact with the rollers 1081, 1082 (as shown in FIGS. 14A-14C, each roller 1081, 1082 may be made up of two vertically stacked rollers). At this point, the outer wrapper material is in an at least partially molten state. As the bundle 1 proceeds through the outfeed system 1060, the rollers 1081, 1082 apply pressure to the end seals 410, thereby fusing the tucked and folded over portions of the end seals 410 to form the first and second outer portions 414, 416 of the end seals 410.

Figure 10:
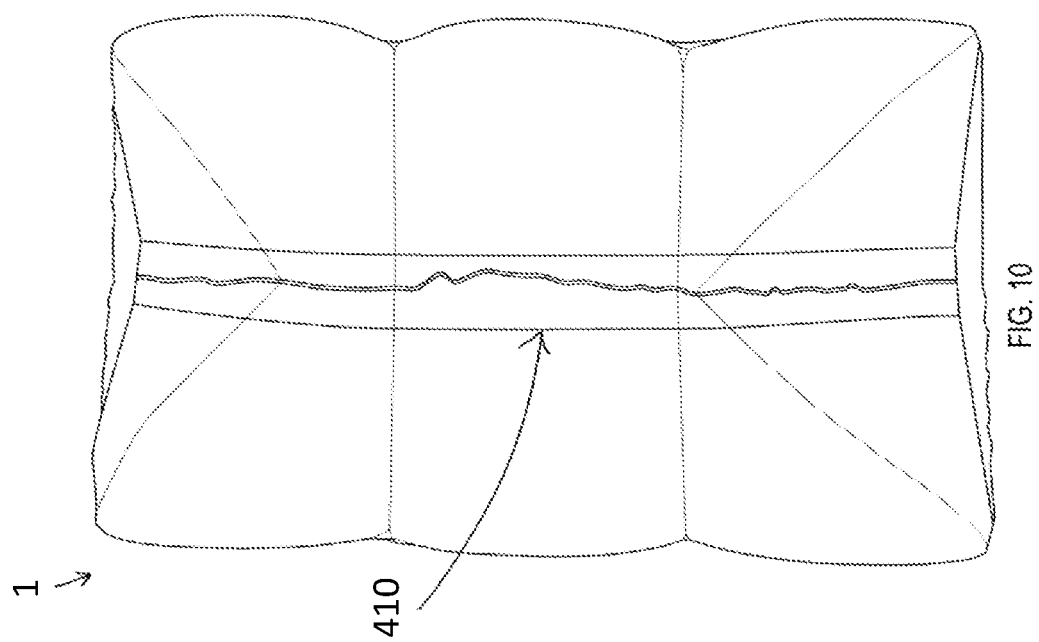
FIG. 10 is a side view of a bundle according to an exemplary embodiment of the present invention.
Figure 11:
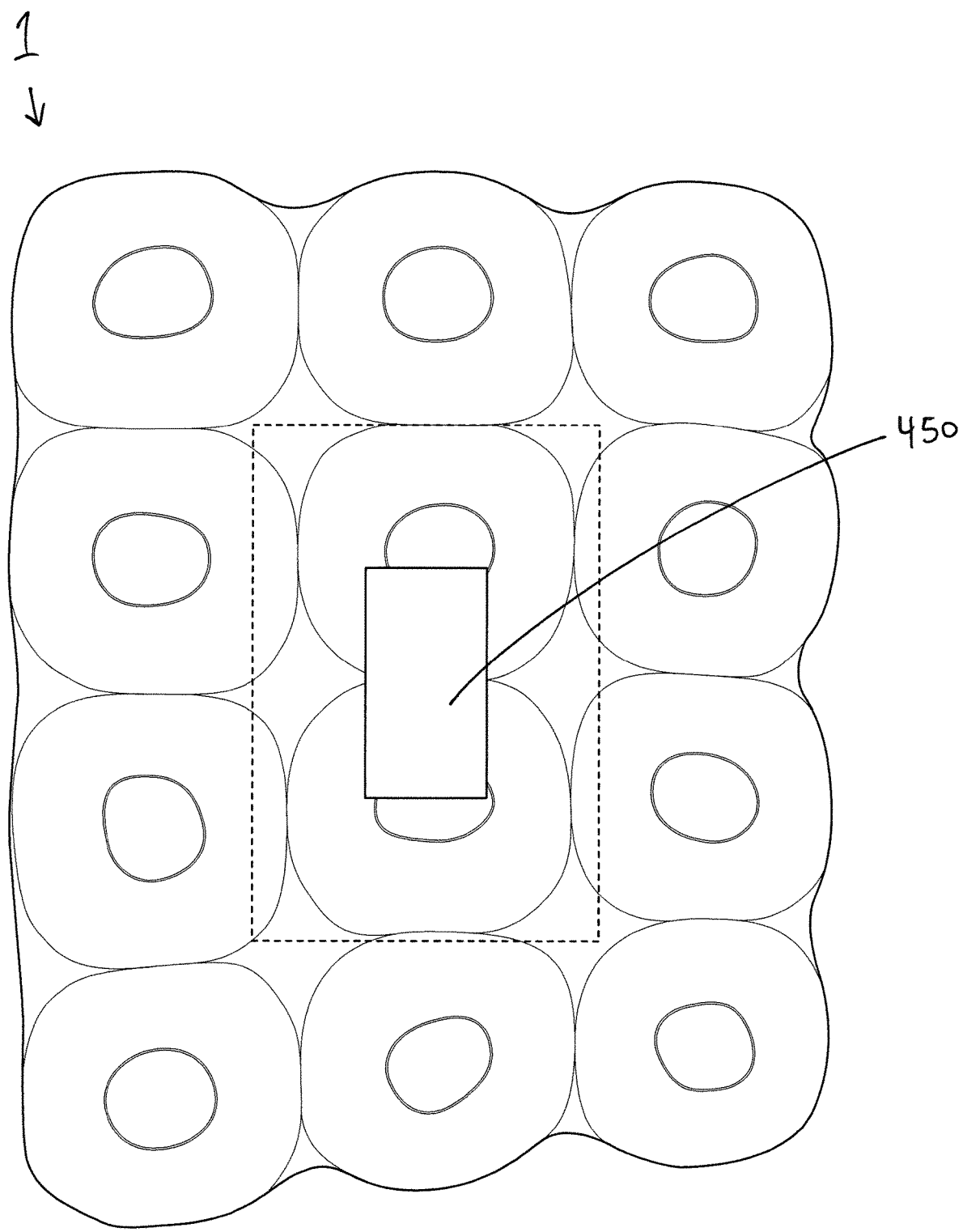
FIG. 11 is a top view of a bundle according to an exemplary embodiment of the present invention.
Figure 12:
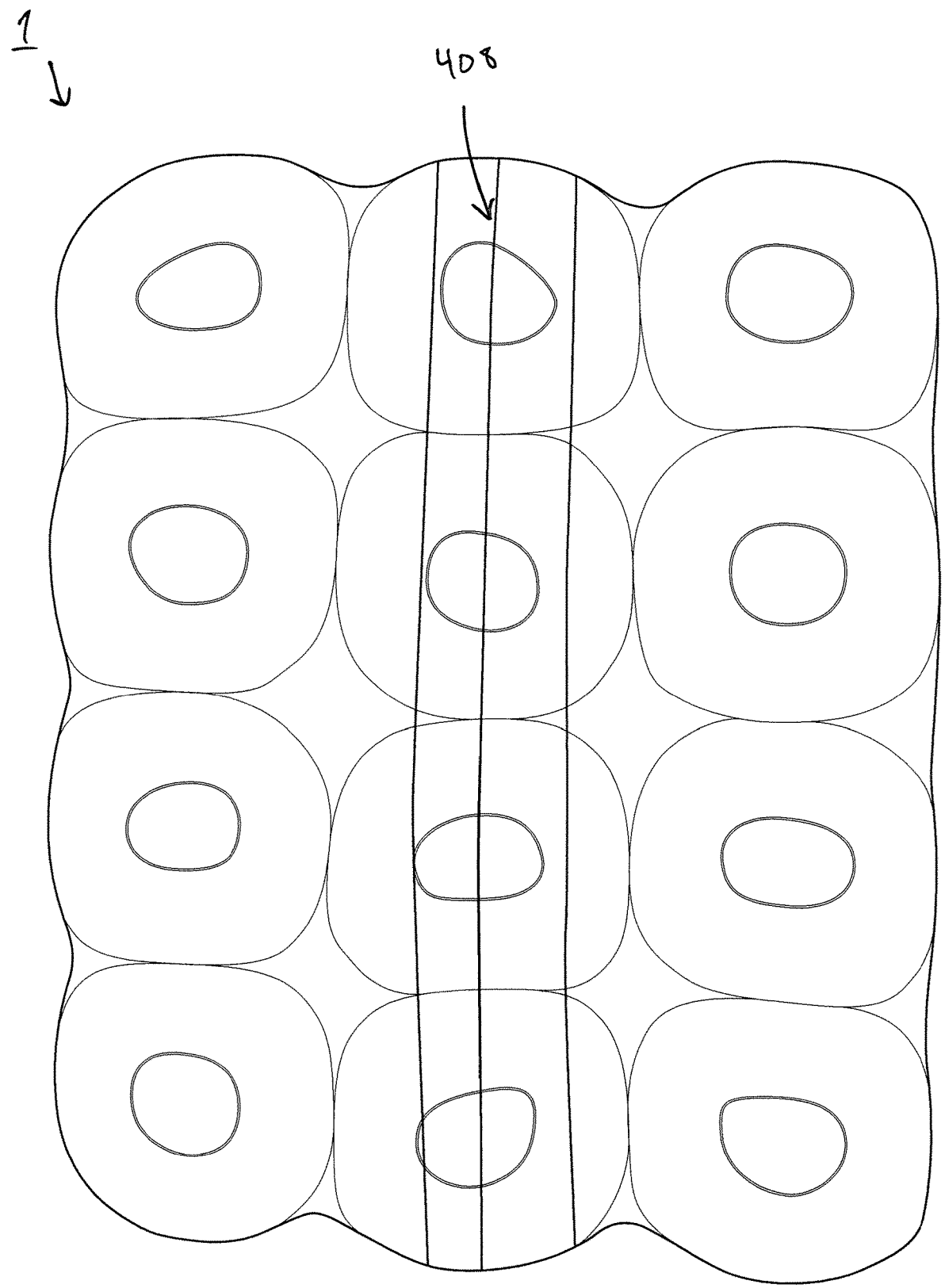
FIG. 12 is a bottom view of a bundle according to an exemplary embodiment of the present invention.
Figure 13:
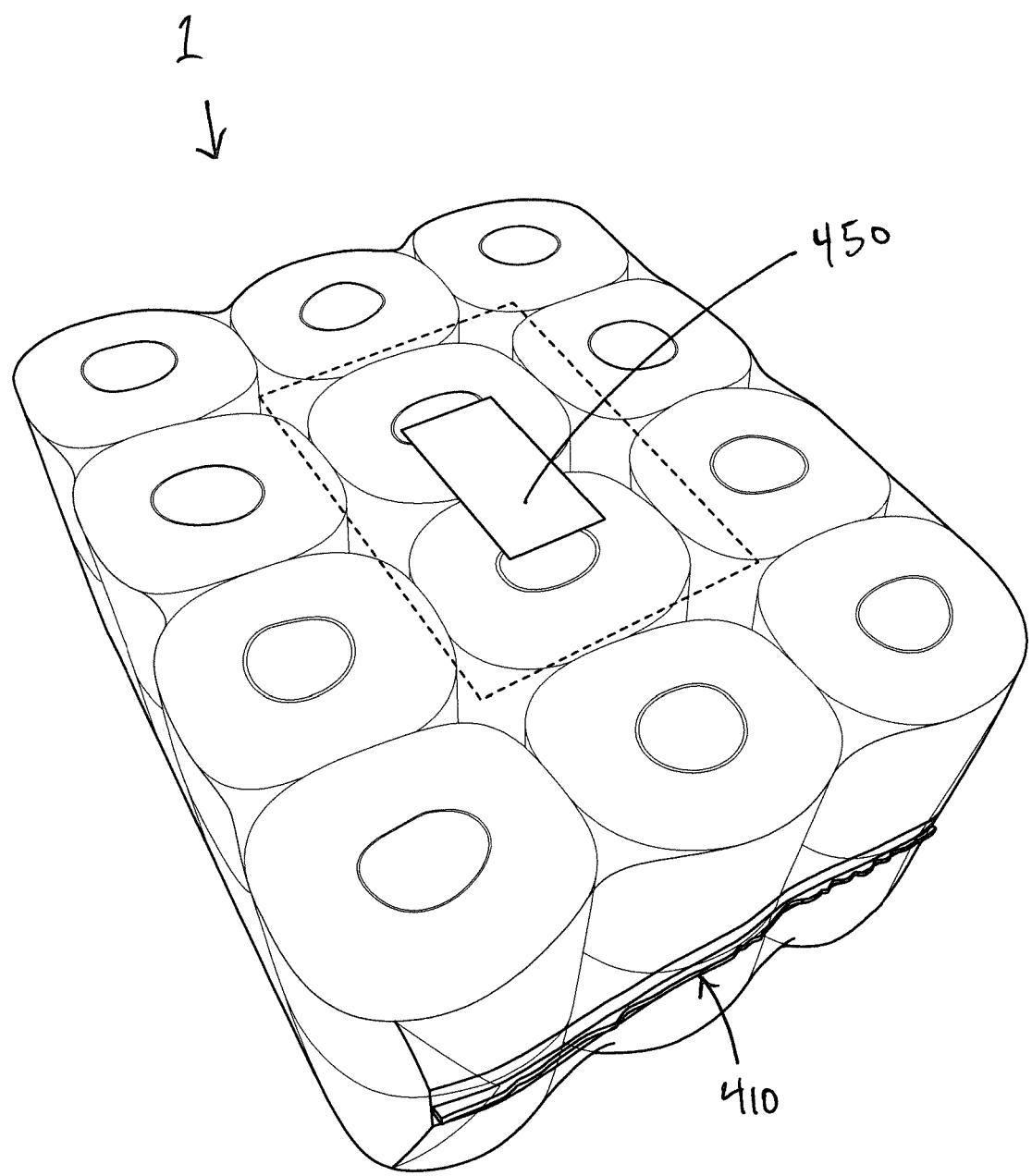
FIG. 13 is a perspective view of a bundle according to an exemplary embodiment of the present invention.

FIGS. 10-13 are various views of the resulting bundle 1, with the end seals 410 not including any open or pocketed portions that might otherwise catch on machinery during transport of the bundle 1. Specifically, FIG. 10 shows a short side of the bundle 1 with a corresponding end seal 410, FIG. 11 is a top view of the bundle 1, FIG. 12 is a bottom view of the bundle 1 showing the lap seal 408 and FIG. 13 is a perspective view of the bundle 1. In an exemplary embodiment, a stock keeping unit (SKU) 450 in the form of a barcode, for example, is printed or otherwise directly disposed on the outer package material. The SKU 450 is readable directly from the outer package so that additional outer packaging, such as a box, is not required. Graphics on the outer package may be adjusted so that they are visually correct after the packaging is heat treated. In this regard, to ensure that a barcode (such as a SKU or UPC) of a given bundle remains optically registered after the heating process, the barcode is printed or otherwise disposed on the outer package material on the panel opposite the lap seal at a location no less than 2.5 inches away from each edge (as indicated by the dashed rectangle in FIGS. 11 and 13). This placement allows for the barcode to be least affected by any shrinkage resulting from the heat treatment and, to the extent that there is shrinkage, the shrinkage is uniform in nature so as to avoid or minimize distortion of the barcode.

Figure 8A:
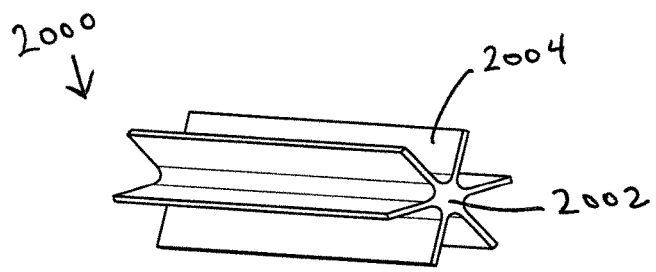
FIGS. 8A-8C are various views of a core insert according to an exemplary embodiment of the present invention.
Figure 8B:
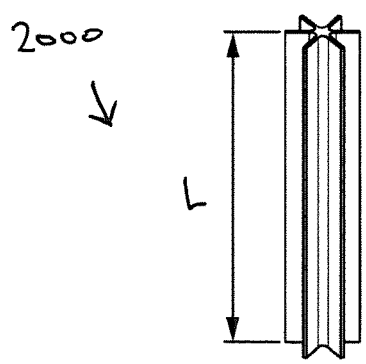
Figure 8C:
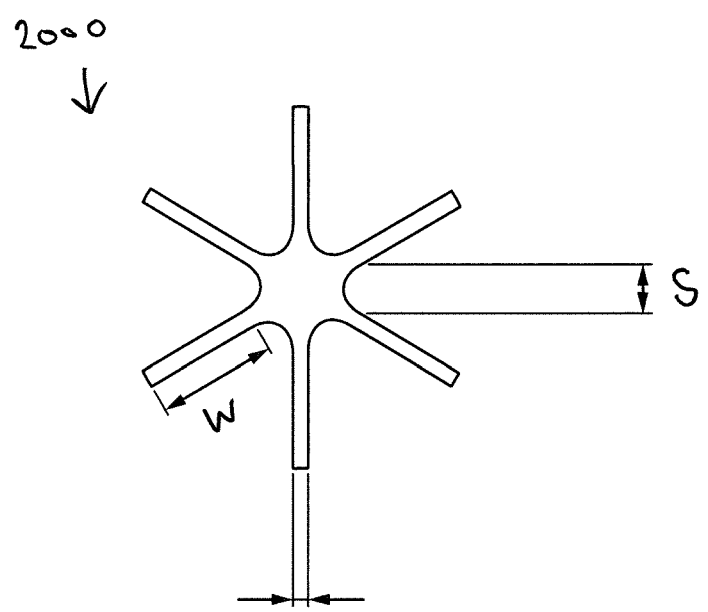
Figure 9:
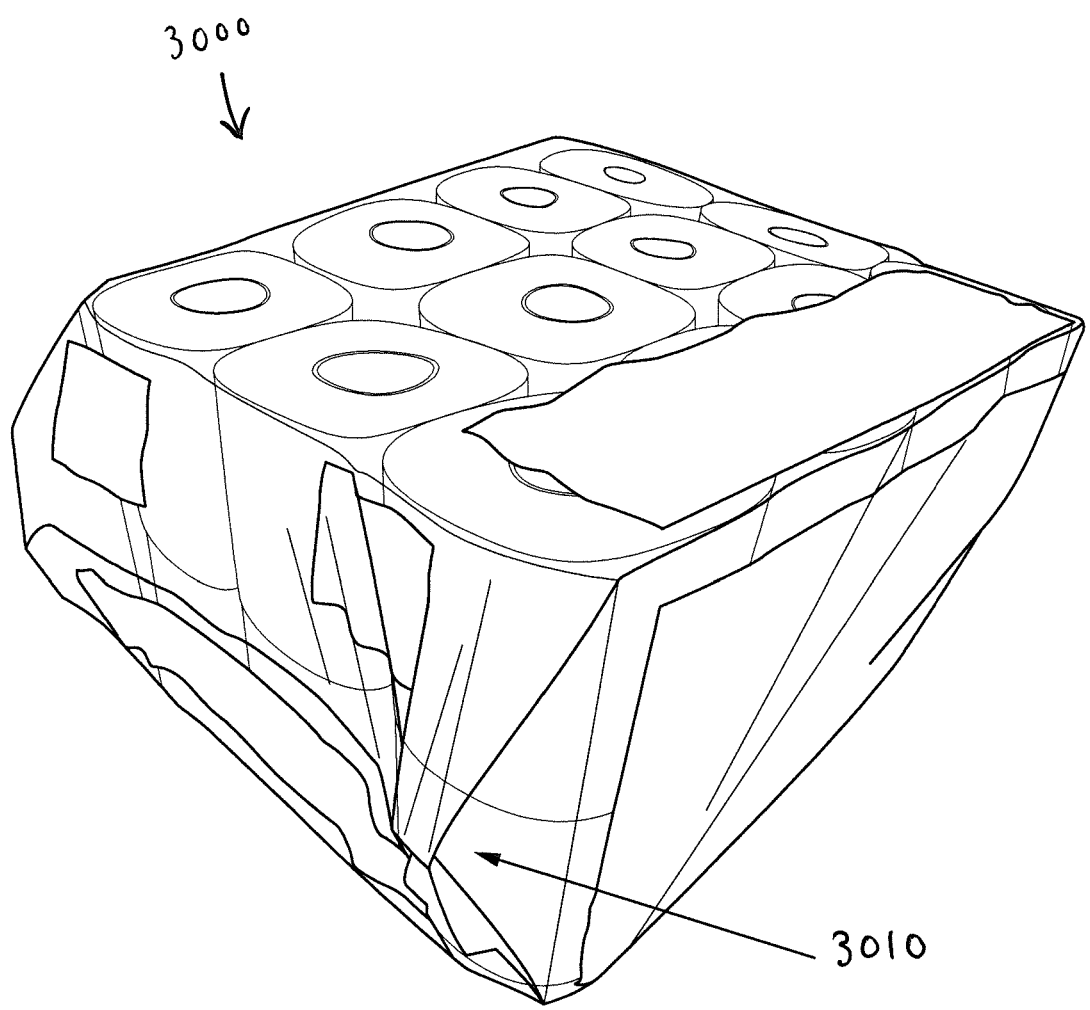
FIG. 9 is a perspective view of a conventional bundle.

FIGS. 8A-8C are various views of a core insert, generally designated by reference number 2000, according to an exemplary embodiment of the present invention. The core insert 2000 is configured for insertion into a standard sized core of a roll of sheet material, which may be, for example, 30-45 mm in diameter and 4 inches in length for bath tissue rolls and 11 inches in length for paper towel rolls. The core insert 2000 may be a generally elongated structure having a central hub 2002 from which extend a plurality of fins 2004. Although six fins 2004 are shown in the figures, it should be appreciated that the core insert 2000 may include any number of such fins 2004. In an exemplary embodiment, the core insert 2000 has a length L of 203.20 mm, a fin width W of 14.07 mm, and fin spacing S of 5.20 mm. It should be appreciated that the dimensions are not limited to these values.

In an exemplary embodiment of the invention, temperature of the heat treatment applied by the heat tunnel is between 300-400° F. and heat is applied to a bundled product for between 20 to 45 seconds. In an exemplary embodiment, the heat is distributed primarily to the top and bottom of the bundle. The effect of this uneven heating is to produce package ends that are tight and molded while keeping the sides of the package smooth with limited wrinkles.

In an exemplary embodiment of the invention, laser energy may be used as a source of heat in the heat treatment process to produce package ends that are tight and molded. Any laser known in the art can be focused on corners of the packages containing laser energy absorbing material such as pigments, dyes, carbon black, rubber, graphite, ceramic and combinations thereof. The laser energy absorbent material may be mixed with or coated onto the polymeric material used to form the inner package material and/or the outer package material. The amount of laser absorbent material in or on the polymeric material may depend on the optical characteristics of the additive and properties of the polymer such as heat capacity and latent heat of fusion, but typically may range from about 0.01 percent to about 5 percent or from about 0.05 percent to about 5 percent or from about 0.1 percent to about 5 percent by weight of the polymeric material. The laser energy absorbing material in the polymer absorbs laser energy, creating sufficient heat to partially melt the other packaging layer and attach the layers. In an exemplary embodiment, an outer gusset is attached to the outer layer.

In exemplary embodiments, the laser energy absorbing material may be present at the first outer portion 414 and the second outer portion 416 of the end seal 410 (see FIG. 3).

In an exemplary embodiment, the bundle 1 is sortable (for the purposes of the present invention, "sortable" is intended to mean that the bundle fits within sortable size dimensions (18 in×14 in×8 in)).

In an exemplary embodiment, the bundle 1 is shippable (for the purposes of the present invention, "shippable" is intended to mean that the package can be successfully transported from distributor to end consumer without any additional packaging).

In an exemplary embodiment, both the inner packaging material 300 and the wrapper 400 are made from a resin that includes both high density polyethylene (HDPE) and low density polyethylene (LDPE). The poly composition for the wrapper 400 may include a greater amount of HDPE than the poly composition for the inner packaging material 300.

In an exemplary embodiment, both the compositions of the inner packaging material 300 and the wrapper 400 include an anti-static additive (such as an amine with ethoxylated surfactants). The amount of anti-static additive may range from about 0.05% to about 20%, based on the total weight of the compositions. The composition of the wrapper 400 may have a lower percentage of anti-static resin than that of the inner packaging material 300. The distribution of anti-static resin in the inner packaging material 300 may be higher on the surface of the inner packaging material 300 facing the wrapper 400 than it is on the surface of the inner packaging material 300 facing the rolled product. Wrapper 400 polymer can be a composition comprised of 100% polypropylene or a mixture of polypropylene and polyethylene, with greater than 10% polypropylene in the outer skins, or greater than 20% polypropylene in the outer skins. Wrapper 300 polymer can be a composition comprised of a mixture of polypropylene and polyethylene, with greater than 10% polypropylene in the outer skins, or greater than 20% polypropylene in the outer skins. The polypropylene controls the tact between wrapper 300 and wrapper 400 post heat treatment.

In an exemplary embodiment, the composition of the inner packaging material 300 has a higher percentage of anti-block additives (such as calcium carbonate, sodium carbonate, or talc) than the composition of the wrapper 400, and the composition of the inner packaging material 300 has a higher percentage of slip additives (such as long chain fats) than the composition of the wrapper 400. The amount of anti-block additive may range from about 0.05% to about 20%, based on the total weight of the composition. Commercially available slip additives can be found in the chemical family known as amides and typically referred to as oleamide or erucamide additives. In exemplary embodiments, if the packaging material is a three layer structure, the material may have the following amounts of slip additives:

Oleamide—1-15% total by weight—as an example, 6% first outer layer, 3% middle layer, 6% second outer layer);

Erucamide—1-15% total by weight—as an example, 6% first outer layer, 3% middle layer, 6% second outer layer).

Table 1 below shows exemplary slip additives per layer of packaging material.

TABLE 1

Example of three layer film

| | Type Additive |
|---|---|
| Skin | Oleamide Slip |
| Core | Oleamide Slip |
| Skin | Oleamide Slip |
| Skin | Erucamide Slip |
| Core | Oleamide Slip |
| Skin | Erucamide Slip |
| Skin | Erucamide Slip |
| Core | Oleamide Slip |
| Skin | Erucamide Slip |
| Skin | Erucamide Slip |
| Core | Oleamide Slip |
| Skin | Erucamide Slip |

It is desirable that the outer packaging and inner packaging do not stick to each other. One approach to preventing the outer packaging and inner packaging from sticking together is to use the slip additives described above. Another approach to preventing the outer and inner packaging from sticking to each other is to use the combination of high density polyethylene and low density polyethylene packaging described above. Combining the combination of high density polyethylene and low density polyethylene packaging and the slip additives is another approach to preventing the outer and inner packaging from sticking to each other.

The following examples illustrate features and advantages of exemplary embodiments of the present invention. The following test methods were used in these examples:

Compression Test Method (ASTM D 642);

Core material Test Methods: Caliper (TAPPI T411), MD Tensile (T494), Basis Weight (TAPPI T410, om-13);

Packaging Material Test Method: Caliper (ASTM D6988-13), MD Tensile (ASTM D882-10), COF (ASTM D1894-11) (suitable COF range between 0.1 to 0.35, or between 0.12 to 0.24, or between 0.16 to 0.20);

Kershaw firmness was determined using a Kershaw Roll Density Tester Model RDT-2000B from Kershaw Instrumentation 517 Auburn Ave. Swedesboro, N.J., USA 08085 as follows:

Procedure

Turn the Roll Density Tester on and allow it to warm up for about 15 minutes.

Make sure the Run/Calibrate switch is in the "RUN" position.

Place the roll to be tested on the test spindle.

Adjust the roll diameter assembly until the pointer indicates the nominal diameter of the roll being tested.

(The roll diameter needs to be converted to inches to set the pointer for the machine diameter.)

Press the "GREEN" forward button, the table will automatically move toward the roll to be tested. Once the probe contacts the roll, the force exerted on the probe will be displayed on the digital force display. The results for the displacement and force will be displayed.

Comparative Example No. 1

The product of this example was a direct to consumer bundled product comprised of four individually packaged groups of six tissue rolls, packaged in a first packaging material/film or "inner wrap", arranged relative to one another as to form a bundle, the bundle being packaged by a second packaging material/film or "outer wrap".

Each package of six rolls was stacked two rolls high (rolls placed end to end) and three rolls wide (rolls placed side to side) with four packages bundled together with the packages placed side to side.

Each tissue roll was 138 mm in diameter, with a Kershaw firmness of 3.5 mm, containing a 42 mm diameter core. The core material used was single ply made from recycled cellulosic fiber sources with the following properties: Basis Weight 52 lbs/ft$^2$, MD tensile strength of 80 lbs force/inch, caliper of 0.01485 inches. The height of each tissue roll was 101 mm. Each roll had a sheet count of 308 2-ply sheets with sheets separated by perforations every 101 mm.

The characteristics of the tissue paper were as follows: MD tensile 150 N/m, CD tensile 90 N/m, MD stretch 15%, CD stretch 8%, Ball Burst 220 gf, Basis Weight 38.6 gsm, and caliper of 500 microns/2 ply.

The packages of six tissue rolls were wrapped using an Ultraflow wrapper machine from Paper Machine Converting Company (PCMC) (Green Bay, Wis., USA). The packaging material or inner wrap was a linear low density polyethylene film with an inside surface (facing the tissue rolls) that was treated with corona plasma, to enhance its ability for ink adhesion, and an outside surface that was untreated. The properties of the film were as follows: caliper of 1.0 mm, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of between 0.18 cof both kinetic and static. When performing the coefficient of friction test, the "treated to treated" cof was a measurement of the friction of two corona treated film surfaces against each other while the "untreated to untreated" was a measurement of the friction of two non-treated film surfaces against each other.

The packages of six tissue rolls were then bundled using a Multiflow Traversing Die (MFTD) from PCMC. The packaging material or outer wrap was a linear low density polyethylene film with an inside surface (facing the tissue rolls) that was treated with corona plasma, to enhance its ability for ink adhesion, and an outside surface that was untreated. The properties of the film were as follows: caliper of 1.5 mm, MD and CD tensile of 4,000 pounds/in$^2$, MD stretch of 500%, CD stretch of 600%, MD coefficient of friction "treated to treated" of 0.18 cof both kinetic and static, MD coefficient of friction "untreated to untreated" of 0.18 cof both kinetic and static.

The bundled product was not heat treated; therefore, the outer wrap/film did not stick to the inner wrap film and no force was required to separate the inner from outer wrap. However; without heat treatment the folded seams on the outer wrap/film do not form a unitary structure and created loose areas that will catch on machinery used in automated shipping facilities such as those utilized by the United States Post Office, United Postal Service, and FedEx. With these loose seams, the bundled product was prevented from being shipped without being placed inside a box or otherwise was subject to fines.

The bundled product in this example lost 6.5 inches in length under 150 lb force, where the force was applied perpendicular to the longest side of the bundle (i.e., force was applied at the point on the bundle that caused the maximum amount of deflection).

Comparative Example No. 2

The product of this example was a direct to consumer bundled product comprised of four individually packaged groups of six tissue rolls, packaged in a first packaging material/film or "inner wrap", arranged relative to one another as to form a bundle, the bundle being packaged by a second packaging material/film or "outer wrap".

Each package of six rolls was stacked two rolls high (rolls placed end to end) and three rolls wide (rolls placed side to side) with four packages bundled together with the packages placed side to side.

Each tissue roll was 138 mm diameter, with a Kershaw firmness of 3.5 mm, containing a 42 mm diameter core. The core material used was a single ply made from recycled cellulosic fiber sources with the following properties: basis weight 52 lbs/ft$^2$, MD tensile strength of 80 lbs force/inch, caliper of 0.01485 inches. The height of each tissue roll was 101 mm. Each roll had a sheet count of 308 2-ply sheets with sheets separated by perforations every 101 mm.

The characteristics of the tissue paper were as follows: MD tensile 150 N/m, CD tensile 90 N/m, MD stretch 15%, CD stretch 8%, ball burst 220 gf, basis weight 38.6 gsm, and caliper of 500 microns/2 ply.

The packages of six tissue rolls were wrapped using an Ultraflow wrapper machine from Paper Machine Converting Company (PCMC) (Green Bay, Wis., USA). The packaging material or inner wrap was a linear low density polyethylene film with an inside surface (facing the tissue rolls) that was treated with corona plasma to enhance its ability for ink adhesion and an outside surface that was untreated. The properties of the film were as follows: caliper of 1.0 mm, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of 0.18 cof both kinetic and static. When performing the coefficient of friction test, the "treated to treated" cof was a measurement of the friction of two corona treated film surfaces against each other while the "untreated to untreated" was a measurement of the friction of two non-treated film surfaces against each other.

The packages of six tissue rolls were then bundled using a Multiflow Traversing Die (MFTD) from PCMC. The packaging material or outer wrap was a linear low density polyethylene film with an inside surface (facing the tissue rolls) that was treated with corona plasma, to enhance its ability for ink adhesion, and an outside surface that was untreated. The properties of the film were as follows: caliper of 1.5 mm, MD and CD tensile of 4,000 pounds/in$^2$, MD stretch of 500%, CD stretch of 600%, MD coefficient of friction "treated to treated" of 0.18 cof both kinetic and static, MD coefficient of friction "untreated to untreated" of 0.18 cof both kinetic and static.

The bundled product then traveled through a Contour S30 Shrink Wrapper from Douglas Machine Inc. (Alexandria, Minn., USA) with the inventive modifications as previously described which included a center justified alignment feed system, a set of center justified rolls at the end of the heat tunnel that placed pressure on the side gussets in an inward vertical direction (where the rollers were tensioned by a spring dampening system that adjusted based on the inner pack density), and a positive traction top belt that was mechanically linked to operate at the same speed as the infeed traction belt.

The bundled product was heat treated, resulting in the inner and outer films sticking together. Using the Peel Test method (ASTM D882-10), 200 grams force was required to separate the inner from outer wrap with significant tears resulting to both inner and outer wrap.

However, with heat treatment, the folded seams on the outer wrap/film formed a unitary seam structure without loose areas that would catch on machinery used in automated shipping facilities (e.g., United States Post Office, United Postal Service, and FedEx). Without the loose seams, the bundled product did not need to be placed inside a box for shipping and was not subjected to fines.

The bundled product in this example lost 6.5 inches in length under 150 lb force, where the force was applied perpendicular to the longest side of the bundle (i.e., force was applied at the point on the bundle that caused the maximum amount of deflection).

Example No. 1

The product in this example was a direct to consumer bundled product comprised of four individually packaged groups of six tissue rolls, packaged in a first packaging material/film or "inner wrap", arranged relative to one another as to form a bundle, the bundle being packaged by a second packaging material/film or "outer wrap".

Each package of six rolls was stacked two rolls tall (rolls placed end to end) and three rolls wide (rolls placed side to side) with four packages bundled together with the packages placed side to side.

Each tissue roll was 138 mm in diameter, with a Kershaw firmness of 3.5 mm, containing a 42 mm diameter core. The core material used was single ply made from recycled cellulosic fiber sources with the following properties: basis weight 52 lbs/ft$^2$, MD tensile strength of 80 lbs force/inch, caliper of 0.01485 inches. Each core had a core insert as shown in FIGS. 8A-8C, with a length of 202 mm (as measured by holding two rolls together end to end), a fin width of 14.07 mm, and fin spacing of 5.2 mm. The height of each tissue roll was 101 mm. Each roll had a sheet count of 308 2-ply sheets with sheets separated by perforations every 101 mm.

The characteristics of the tissue paper were as follows: MD tensile 150 N/m, CD tensile 90 N/m, MD stretch 15%, CD stretch 8%, ball burst 220 gf, basis weight 38.6 gsm, and caliper of 500 microns/2 ply.

The packages of six tissue rolls were wrapped using an Ultraflow wrapper machine from Paper Machine Converting Company (PCMC) (Green Bay, Wis., USA). The packaging material or inner wrap was comprised of a resin that included both high density polyethylene and low density polyethylene. The packaging material had an inside surface (facing the tissue rolls) that was treated with corona plasma to enhance its ability for ink adhesion and an outside surface that was untreated. The packaging material also included a combination slip/anti-block additive, Ampacet 100158 (Ampacet Corporation, Tarrytown, N.Y., USA), containing 20% anti-block (diatomaceous earth) and 5% slip (erucamide). The treated side of the packaging material contained 4 wt % of Ampacet and the untreated side contained 10 wt % of Ampacet. The properties of the film were as follows: caliper of 1.0 mm, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of 0.18 cof both kinetic and static. When performing the coefficient of friction test the "treated to treated" cof was a measurement of the friction of two corona treated film surfaces against each other while the "untreated to untreated" was a measurement of the friction of two non-treated film surfaces against each other.

The packages of six tissue rolls were then bundled using a Multiflow Traversing Die (MFTD) from PCMC. The packaging material or outer wrap was part no. C9824 purchased from Bemis Company, Inc (2200 Badger Ave Oshkosh Wis. 54903). This outer wrap film was a coextruded polyethylene and polypropylene material ideal for film on film packaging application with an inside surface (facing the tissue rolls) that was treated with corona plasma to enhance its ability for ink adhesion and an outside surface that was untreated. The properties of the film were as follows: caliper of 2.0 mm, MD and CD tensile of 4,000 pounds/in$^r$, MD stretch of 400%, CD stretch of 600%, MD coefficient of friction "treated to treated" of 0.20 cof both kinetic and static, MD coefficient of friction "untreated to untreated" of 0.20 cof both kinetic and static.

The bundled product then traveled through a Contour S30 Shrink Wrapper from Douglas Machine Inc. (Alexandria, Minn., USA) with the inventive modifications as previously described which included a center justified alignment feed system, a set of center justified rolls at the end of the heat tunnel that placed pressure on the side gussets in an inward vertical direction (where the rollers were tensioned by a spring dampening system that adjusted based on the inner pack density), and a positive traction top belt that was mechanically linked to operate at the same speed as the infeed traction belt.

The bundled product was heat treated but with the inventive outer wrap the outer film did not stick to the inner wrap/film. Using the Peel Test method (ASTM D882-10), 10 grams force was required to separate the inner from outer wrap with no tearing of either the inner or outer wrap/film. In general, in accordance with exemplary embodiments of the present invention, the amount of force required to separate the inner from outer wrap with no tearing may range from about 0 to about 100, or from about 0 to about 71, or from about 0 to about 50, or from about 0 to about 20, or less than 10. Also, in accordance with exemplary embodiments, a substantial portion of the inner surface of the second package material is in contact with the first package material of the plurality of paper product rolls and is nonstick relative to the first package material. In this context, "a substantial portion" means more than 30%, or more than 50%, or more than 75%, or 100% of the inner surface area of the second packaging material.

With heat treatment the folded seams on the outer wrap/film formed a unitary seam structure without loose areas that would catch on machinery used in automated shipping facilities (e.g., United States Post Office, United Postal Service, and FedEx). Without these loose seams, the bundled product did not need to be placed inside a box for shipping and was not subjected to fines.

The bundled product in this example lost 0.5 inches in length under 150 lb force, where the force was applied perpendicular to the longest side of the bundle (i.e., force was applied at the point on the bundle that caused the maximum amount of deflection).

Comparative Example No. 3

The product of this example was a direct to consumer bundled product comprised of twelve individually packaged rolls of paper towel, packaged in a first packaging material/film or "inner wrap", arranged relative to one another as to form a bundle, the bundle being packaged by a second packaging material/film or "outer wrap". The towel rolls were arranged four rolls wide by three rolls in length inside the bundled product.

Each towel roll was 146 mm in diameter, with a Kershaw firmness of 6.0 mm, containing a 42 mm diameter core. The core material used was single ply made from recycled cellulosic fiber sources with the following properties: basis weight 52 lbs/ft$^2$, MD tensile strength of 80 lbs force/inch, caliper of 0.01485 inches. The height of each towel roll was 279.4 mm. Each roll had a sheet count of 158 2-ply sheets with sheets separated by perforations every 152.4 mm.

The characteristics of the towel paper were as follows: MD tensile 400 N/m, CD tensile 385 N/m, MD stretch 12%, CD stretch 6%, Ball Burst 950 gf, Basis Weight 40.6 gsm, and caliper of 790 microns/2 ply.

The packages of 12 towel rolls were wrapped using an Ultraflow wrapper machine from Paper Machine Converting Company (PCMC) (Green Bay, Wis., USA). The packaging material or inner wrap was a linear low density polyethylene film with an inside surface (facing the tissue rolls) that was treated with corona plasma to enhance its ability for ink adhesion and an outside surface that was untreated. The properties of the film were as follows: caliper of 1.0 mm, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of 0.18 cof both kinetic and static. When performing the coefficient of friction test the "treated to treated" cof was a measurement of the friction of two corona treated film surfaces against each other while the "untreated to untreated" was a measurement of the friction of two non-treated film surfaces against each other.

The packages of twelve towel rolls were then bundled using a Multiflow Traversing Die (MFTD) from PCMC. The packaging material or outer wrap was a linear low density polyethylene film with an inside surface (facing the tissue rolls) that was treated with corona plasma, to enhance its ability for ink adhesion, and an outside surface that was untreated. The properties of the film were as follows: caliper of 1.5 mm, MD and CD tensile of 4,000 pounds/in$^r$, MD stretch of 500%, CD stretch of 600%, MD coefficient of friction "treated to treated" of 0.18 cof both kinetic and static, MD coefficient of friction "untreated to untreated" of 0.18 cof both kinetic and static.

The bundled product was not heat treated; therefore, the outer wrap/film did not stick to the inner wrap film and no force was required to separate the inner from outer wrap. However, without heat treatment the folded seams on the outer wrap/film do not form a unitary seam and there were loose areas that caught on machinery used in automated shipping facilities (e.g., United States Post Office, United Postal Service, and FedEx). With these loose seams, the bundled product could not be shipped without being placed inside a box and was otherwise subject to fines.

The bundled product in this example lost 7.5 inches in length under 150 lb force, where the force was applied perpendicular to the longest side of the bundle (i.e., force was applied at the point on the bundle that caused the maximum amount of deflection).

Comparative Example No. 4

The product of this example was a direct to consumer bundled product comprised of twelve individually packaged rolls of paper towel, packaged in a first packaging material/film or "inner wrap", arranged relative to one another as to form a bundle, the bundle being packaged by a second packaging material/film or "outer wrap". The towel rolls were arranged four rolls wide by three rolls in length inside the bundled product.

Each towel roll was 146 mm in diameter, with a Kershaw firmness of 6.0 mm, containing a 42 mm diameter core. The core material used was a single ply made from recycled cellulosic fiber sources with the following properties: basis weight 52 lbs/ft$^2$, MD tensile strength of 80 lbs force/inch, caliper of 0.01485 inches. The height of each towel roll was 279.4 mm. Each roll had a sheet count of 158 2-ply sheets with sheets separated by perforations every 152.4 mm.

The characteristics of the towel paper were as follows: MD tensile 400 N/m, CD tensile 385 N/m, MD stretch 12%, CD stretch 6%, ball burst 950 gf, basis weight 40.6 gsm, and caliper of 790 microns/2 ply.

The packages of 12 towel rolls were wrapped using an Ultraflow wrapper machine from Paper Machine Converting Company (PCMC) (Green Bay, Wis., USA). The packaging material or inner wrap was a linear low density polyethylene film with an inside surface (facing the tissue rolls) that was treated with corona plasma to enhance its ability for ink adhesion and an outside surface that was untreated. The properties of the film were as follows: caliper of 1.0 mm, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of 0.18 cof both kinetic and static. When performing the coefficient of friction test the "treated to treated" cof was a measurement of the friction of two corona treated film surfaces against each other while the "untreated to untreated" was a measurement of the friction of two non-treated film surfaces against each other.

The packages of twelve towel rolls were then bundled using a Multiflow Traversing Die (MFTD) from PCMC. The packaging material or outer wrap was a linear low density polyethylene film with an inside surface (facing the tissue rolls) that was treated with corona plasma, to enhance its ability for ink adhesion, and an outside surface that was untreated. The properties of the film were as follows: caliper of 1.5 mm, MD and CD tensile of 4,000 pounds/in$^2$, MD stretch of 500%, CD stretch of 600%, MD coefficient of friction "treated to treated" of 0.18 cof both kinetic and static, MD coefficient of friction "untreated to untreated" of 0.18 cof both kinetic and static.

The bundled product then traveled through a Contour S30 Shrink Wrapper from Douglas Machine Inc. (Alexandria, Minn., USA) with the inventive modifications as previously described including a center justified alignment feed system, a set of center justified rolls at the end of the heat tunnel that placed pressure on the side gussets in an inward vertical direction (where the rollers were tensioned by a spring dampening system that adjusted based on the inner pack density), and a positive traction top belt that was mechanically linked to operate at the same speed as the infeed traction belt.

Heat treatment of the bundled product resulted in the inner and outer films sticking together. Using the Peel Test method (ASTM D882-10), 200 grams force was required to separate the inner from outer wrap with significant tears resulting to both inner and outer wrap.

However, with heat treatment, the folded seams on the outer wrap/film formed a unitary seam structure without loose areas that caught on machinery used in automated shipping facilities (e.g., United States Post Office, United Postal Service, and FedEx). Without the loose seams, the bundled product could ship without being placed inside a box and without being subject to fines.

The bundled product in this example lost 7.5 inches in length under 150 lb force, where the force was applied perpendicular to the longest side of the bundle (i.e., force was applied at the point on the bundle that caused the maximum amount of deflection).

Example No. 2

The product in this example was a direct to consumer bundled product comprised of twelve individually packaged rolls of paper towel, packaged in a first packaging material/film or "inner wrap", arranged relative to one another as to form a bundle, the bundle being packaged by a second packaging material/film or "outer wrap". The towel rolls were arranged four rolls wide by three rolls in length inside the bundled product.

Each towel roll was 146 mm diameter, with a Kershaw firmness of 6.0 mm, containing a 42 mm diameter core. The core material used was single ply made from recycled cellulosic fiber sources with the following properties: basis weight 52 lbs/ft$^2$, MD tensile strength of 80 lbs force/inch, caliper of 0.01485 inches. Each core had a core insert as shown in FIGS. 8A-8C with a length of 280 mm (as measured holding two rolls together end to end), a fin width of 14.07 mm, and fin spacing of 5.2 mm. The height of each towel roll was 279.4 mm. Each roll had a sheet count of 158 2-ply sheets with sheets separated by perforations every 152.4 mm.

The characteristics of the towel paper were as follows: MD tensile 400 N/m, CD tensile 385 N/m, MD stretch 12%, CD stretch 6%, ball burst 950 gf, basis weight 40.6 gsm, and caliper of 790 microns/2 ply.

The packages of twelve towel rolls were wrapped using an Ultraflow wrapper machine from Paper Machine Converting Company (PCMC) (Green Bay, Wis., USA). The packaging material or inner wrap was comprised of a resin that included both high density polyethylene and low density polyethylene. The packaging material had an inside surface (facing the tissue rolls) that was treated with corona plasma to enhance its ability for ink adhesion and an outside surface that was untreated. The packaging material also included a combination slip/anti-block additive, Ampacet 100158 (Ampacet Corporation, Tarrytown, N.Y., USA), containing 20% anti-block (diatomaceous earth) and 5% slip (erucamide). The treated side of the packaging material contained 4 wt % of Ampacet and the untreated side contained 10 wt % of Ampacet. The properties of the film were as follows: caliper of 1.0 mm, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of 0.18 cof both kinetic and static. When performing the coefficient of friction test the "treated to treated" cof was a measurement of the friction of two corona treated film surfaces against each other while the "untreated to untreated" was a measurement of the friction of two non-treated film surfaces against each other.

The packages of twelve towel rolls were then bundled using a Multiflow Traversing Die (MFTD) from PCMC. The packaging material or outer wrap was part no. C9824 purchased from Bemis Company, Inc (2200 Badger Ave Oshkosh Wis. 54903). This outer wrap film was a coextruded polyethylene and polypropylene material ideal for film on film packaging application with an inside surface (facing the towel rolls) that was treated with corona plasma to enhance its ability for ink adhesion and an outside surface that was untreated. The properties of the film were as follows: caliper of 2.0 mm, MD and CD tensile of four thousand pounds/in$^2$, MD stretch of 400%, CD stretch of 600%, MD coefficient of friction "treated to treated" of 0.20 cof both kinetic and static, MD coefficient of friction "untreated to untreated" of 0.20 cof both kinetic and static.

The bundled product then traveled through a Contour S30 Shrink Wrapper from Douglas Machine Inc. (Alexandria, Minn., USA) with the inventive modifications as previously described including a center justified alignment feed system, a set of center justified rolls at the end of the heat tunnel that placed pressure on the side gussets in an inward vertical direction (where the rollers were tensioned by a spring dampening system that adjusted based on the inner pack density), and a positive traction top belt that was mechanically linked to operate at the same speed as the infeed traction belt.

The bundled product was heat treated but with the inventive outer wrap the film did not stick to the inner wrap/film. Using the Peel Test method (ASTM D882-10), 10 grams force was required to separate the inner from outer wrap with no tearing of either the inner or outer wrap/film.

With heat treatment the folded seams on the outer wrap/film formed a unitary seam structure without loose areas that caught on machinery used in automated shipping facilities (e.g., United States Post Office, United Postal Service, and FedEx). Without these loose seams, the bundled product was able to ship without being placed inside a box and without being subject to fines.

The bundled product in this example lost 0.65 inches in length under 150 lb force, where the force was applied perpendicular to the longest side of the bundle (i.e., force was applied at the point on the bundle that caused the maximum amount of deflection).

Example No. 3

The product in this example was a direct to consumer bundled product comprised of four individually packaged groups of six tissue rolls, packaged in a first packaging material/film or "inner wrap", arranged relative to one another as to form a bundle, the bundle being packaged by a second packaging material/film or "outer wrap".

Each package of six rolls was stacked two rolls tall (rolls placed end to end) and three rolls wide (rolls placed side to side) with four packages bundled together with the packages placed side to side.

Each tissue roll was 138 mm in diameter, with a Kershaw firmness of 3.5 mm, containing a 42 mm diameter core. The core material used was single ply made from recycled cellulosic fiber sources with the following properties: basis weight 52 lbs/ft$^2$, MD tensile strength of 80 lbs force/inch, caliper of 0.01485 inches. Each core had a core insert as shown in FIGS. 8A-8C, with a length of 202 mm (as measured by holding two rolls together end to end), a fin width of 14.07 mm, and fin spacing of 5.2 mm. The height of each tissue roll was 101 mm. Each roll had a sheet count of 308 2-ply sheets with sheets separated by perforations every 101 mm.

The characteristics of the tissue paper were as follows: MD tensile 150 N/m, CD tensile 90 N/m, MD stretch 15%, CD stretch 8%, ball burst 220 gf, basis weight 38.6 gsm, and caliper of 500 microns/2 ply.

The packages of six tissue rolls were wrapped using an Ultraflow wrapper machine from Paper Machine Converting Company (PCMC) (Green Bay, Wis., USA). The packaging material or inner wrap was comprised of a resin that included both high density polyethylene and low density polyethylene. The packaging material had an inside surface (facing the tissue rolls) that was treated with corona plasma to enhance its ability for ink adhesion and an outside surface that was untreated. The packaging material also included a combination slip/anti-block additive, Ampacet 100158 (Ampacet Corporation, Tarrytown, N.Y., USA), containing 20% anti-block (diatomaceous earth) and 5% slip (erucamide). The treated side of the packaging material contained 4 wt % of Ampacet and the untreated side contained 10 wt % of Ampacet. The properties of the film were as follows: caliper of 1.0 mil, MD tensile of 5,000 pounds/in$^2$, CD tensile of 3,500 pounds/in$^2$, MD stretch of 350%, CD stretch of 400%, MD coefficient of friction ("cof") "treated to treated" of 0.18 cof both kinetic and static, MD coefficient of friction "untreated to untreated" of 0.18 cof both kinetic and static. When performing the coefficient of friction test the "treated to treated" cof was a measurement of the friction of two corona treated film surfaces against each other while the "untreated to untreated" was a measurement of the friction of two non-treated film surfaces against each other.

The packages of six tissue rolls were then bundled using a Multiflow Traversing Die (MFTD) from PCMC. The packaging material or outer wrap was part no. C9824 purchased from Bemis Company, Inc (2200 Badger Ave Oshkosh Wis. 54903). This outer wrap film was a coextruded polyethylene and polypropylene material ideal for film on film packaging application with an inside surface (facing the tissue rolls) that was treated with corona plasma to enhance its ability for ink adhesion and an outside surface that was untreated. The properties of the film were as follows: caliper of 2.0 mil, MD and CD tensile of 4,000 pounds/in$^t$, MD stretch of 400%, CD stretch of 600%, MD coefficient of friction "treated to treated" of 0.20 cof both kinetic and static, and MD coefficient of friction "untreated to untreated" of 0.20 cof both kinetic and static.

The bundled product then traveled through a Contour S30 Shrink Wrapper from Douglas Machine Inc. (Alexandria, Minn., USA) with the inventive modifications as previously described which included a center justified alignment feed system.

The bundled product was heat treated but with the inventive outer wrap the outer film did not stick to the inner wrap/film. Using the Peel Test method (ASTM D882-10), 10 grams force was required to separate the inner wrap from the outer wrap with no tearing of either the inner or outer wrap/film.

The bundled product then traveled to a system where previously printed areas with black pigment ink are subject to intense heat energy provided by a laser system. The black ink was applied to the gusset areas on the bundle, at the point where four layers of poly occur. The pigment was either applied via in line printing with a heat transfer ribbon system or printed on the poly prior using a flexo printing method. The bundled product moved up to a stationary device that put pressure on the end gusset seals in order to make them smooth. A vision system determined where the black ink areas are and focused the heat energy from a laser on those areas in order to melt the multiple layers of polyethylene film together. The vision system was a Cognex In-Sight 2000 vision sensor (Cognex Corporation, Natick, Mass., USA), although other visions systems are suitable. The heat energy was focused enough where it only melted the secondary packaging material and not the inner (primary) packaging material. All four corners of the bundled product were treated with the laser system to provide a seal.

With heat treatment the folded seams on the outer wrap/ film formed a unitary seam structure without loose areas that would catch on machinery used in automated shipping facilities (e.g., United States Post Office, United Postal Service, and FedEx). Without these loose seams, the bundled product did not need to be placed inside a box for shipping and was not subjected to fines.

The bundled product in this example lost 0.5 inches in length under 150 lb force, where the force was applied perpendicular to the longest side of the bundle (i.e., force was applied at the point on the bundle that caused the maximum amount of deflection).

Example No. 4

The product in this example was a direct to consumer bundled product comprised of four individually packaged groups of six tissue rolls, packaged in a first packaging material/film or "inner wrap", arranged relative to one another so as to form a bundle, the bundle being packaged by a second packaging material/film or "outer wrap".

Each package of six rolls was stacked two rolls tall (rolls placed end to end) and three rolls wide (rolls placed side to side) with four packages bundled together with the packages placed side to side.

Each tissue roll was 138 mm in diameter, with a Kershaw firmness of 3.5 mm, containing a 42 mm diameter core. The core material used was single ply made from recycled cellulosic fiber sources with the following properties: basis weight 52 lbs/ft$^2$, MD tensile strength of 80 lbs force/inch, caliper of 0.01485 inches. Each core had a core insert as shown in FIGS. 8A-8C, with a length of 202 mm (as measured by holding two rolls together end to end), a fin width of 14.07 mm, and fin spacing of 5.2 mm. The height of each tissue roll was 101 mm. Each roll had a sheet count of 308 2-ply sheets with sheets separated by perforations every 101 mm.

The characteristics of the tissue paper were as follows: MD tensile 150 N/m, CD tensile 90 N/m, MD stretch 15%, CD stretch 8%, ball burst 220 gf, basis weight 38.6 gsm, and caliper of 500 microns/2 ply.

The packages of six tissue rolls were wrapped using an Ultraflow wrapper machine from Paper Machine Converting Company (PCMC) (Green Bay, Wis., USA). The packaging material or inner wrap was comprised of a resin that included both high density polyethylene and low density polyethylene. The packaging material had an inside surface (facing the tissue rolls) that was treated with corona plasma to enhance its ability for ink adhesion and an outside surface that was untreated. The packaging material also included a combination slip/anti-block additive, Ampacet 100158 (Ampacet Corporation, Tarrytown, N.Y., USA), containing 20% anti-block (diatomaceous earth) and 5% slip (erucamide). The treated side of the packaging material contained 4 wt % of Ampacet and the untreated side contained 10 wt % of Ampacet. The properties of the film were as follows: caliper of 1.0 mil, MD tensile of 5,000 pounds/in$^2$, CD tensile of 3,500 pounds/in$^2$, MD stretch of 350%, CD stretch of 400%, MD coefficient of friction "treated to treated" of 0.18 cof both kinetic and static, MD coefficient of friction "untreated to untreated" of 0.18 cof both kinetic and static. When performing the coefficient of friction test the "treated to treated" cof was a measurement of the friction of two corona treated film surfaces against each other while the "untreated to untreated" was a measurement of the friction of two non-treated film surfaces against each other.

The packages of six tissue rolls were then bundled using a Multiflow Traversing Die (MFTD) from PCMC. The packaging material or outer wrap was part no. C9824 purchased from Bemis Company, Inc (2200 Badger Ave Oshkosh Wis. 54903). This outer wrap film was a coextruded polyethylene and polypropylene material ideal for film on film packaging application with an inside surface (facing the tissue rolls) that was treated with corona plasma to enhance its ability for ink adhesion and an outside surface that was untreated. The properties of the film were as follows: caliper of 2.0 mil, MD and CD tensile of 4,000 pounds/in$^2$, MD stretch of 400%, CD stretch of 600%, MD coefficient of friction "treated to treated" of 0.20 cof both kinetic and static, MD coefficient of friction "untreated to untreated" of 0.20 cof both kinetic and static.

The bundled product then traveled through a Contour S30 Shrink Wrapper from Douglas Machine Inc. (Alexandria, Minn., USA) with the inventive modifications as previously described which included a center justified alignment feed system The bundled product then traveled to a stationary system which held the bundle in place so that a predetermined amount of adhesive (or glue) could be applied to the folded gusset areas. The glue can be low or high temperature melt glue, latex based glue, cold seal glue, or tape based adhesive. The amount of adhesive varied depending on the size of the bundle and the packaging material used, but is sufficient to bond the gusset to the outer packaging material. Linear arm devices with glue guns at the end were inserted into the bundled product and glue is applied. A set of side rollers placed pressure on the glued areas in order to evenly place the glue across the entire seal area.

The bundled product was heat treated but with the inventive outer wrap the outer film did not stick to the inner wrap/film. Using the Peel Test method (ASTM D882-10), 10 grams force was required to separate the inner wrap from the outer wrap with no tearing of either the inner or outer wrap/film.

With heat treatment the folded seams on the outer wrap/ film formed a unitary seam structure without loose areas that would catch on machinery used in automated shipping facilities (e.g., United States Post Office, United Postal Service, and FedEx). Without these loose seams, the bundled product did not need to be placed inside a box for shipping and was not subjected to fines.

The bundled product in this example lost 0.5 inches in length under 150 lb force, where the force was applied perpendicular to the longest side of the bundle (i.e., force was applied at the point on the bundle that caused the maximum amount of deflection).

While in the foregoing specification a detailed description of a specific embodiment of the invention was set forth, it will be understood that many of the details herein given may be varied considerably by those skilled in the art without departing from the spirit and scope of the invention.

The invention claimed is:

1. A direct-to-consumer heat shrunk bundled product comprising:
   a plurality of paper product rolls each individually packaged by a first package material and arranged relative to one another so as to form a bundle, the bundle being packaged by a second package material, wherein portions of the second package material comprise from about 0.01 to about 5 weight percent of a laser energy absorbing material and a substantial portion of the inner surface of the second package material is in contact with the first package material of the plurality of paper product rolls and is nonstick relative to the first package material so that 10 grams of force or less is required to separate the first package material from the second package material as tested in accordance with an ASTM D882-10 peel test method.

2. The direct-to-consumer heat shrunk bundled product of claim 1, wherein separation of the second package material from the first package material is achieved without tearing of the first and second package materials and the laser energy absorbing material is selected from the group consisting of pigments, dyes, carbon black, rubber, graphite, ceramic and combinations thereof.

3. The direct-to-consumer heat shrunk bundled product of claim 1, wherein the first packaging material comprises a resin that includes high density polyethylene and low density polyethylene.

4. The direct-to-consumer heat shrunk bundled product of claim 3, wherein the first packaging material further comprises an antistatic additive.

5. The direct-to-consumer heat shrunk bundled product of claim 4, wherein the antistatic additive is an amine with at least one of ethoxylated surfactants, nonionic migratory surfactants or internal non-migratory antistats that create a percolating network.

6. The direct-to-consumer heat shrunk bundled product of claim 5, wherein the amine has nonionic migratory surfactants, and the nonionic migratory surfactants are selected from the group consisting of GMS (glycerol monostearate), ethoxylated fatty acid amines, and diethanolamides.

7. The direct-to-consumer heat shrunk bundled product of claim 5, wherein the amine has internal non-migratory antistats that create a percolating network, and the internal non-migratory antistats are selected from the group consisting of carbon black, carbon nanotubes or fibers, and metallized fillers.

8. The direct-to-consumer heat shrunk bundled product of claim 4, wherein the antistatic additive is present in an amount of 0.05-20 wt %.

9. The direct-to-consumer heat shrunk bundled product of claim 3, wherein the first packaging material further comprises an anti-block additive.

10. The direct-to-consumer heat shrunk bundled product of claim 9, wherein the anti-block additive is selected from the group consisting of calcium carbonate, sodium carbonate, talc and antiblock agent glass spheres.

11. The direct-to-consumer heat shrunk bundled product of claim 9, wherein the anti-block additive is present in an amount of 0.05-20 wt %.

12. The direct-to-consumer heat shrunk bundled product of claim 1, wherein the first packaging material comprises an inside surface treated with corona plasma.

13. The direct-to-consumer heat shrunk bundled product of claim 1, wherein the second package material is a coextruded polyethylene and polypropylene material.

14. The direct-to-consumer heat shrunk bundled product of claim 1, wherein the second package material forms an outer wrapper, the outer wrapper comprising at least one end seal.

15. The direct-to-consumer heat shrunk bundled product of claim 14, wherein the at least one end seal comprises a middle portion made up of two overlapping layers of the second package material and side portions made up of at least three overlapping layers of the second package material.

16. The direct-to-consumer heat shrunk bundled product of claim 15, wherein the at least three overlapping layers of the second package material that form the side portions of the at least one end seal are fused to one another so that there are no openings between the at least three overlapping and fused layers.

17. A method of forming a direct-to-consumer heat shrunk bundled product comprising:
individually packaging a plurality of paper product rolls with a first packaging material so as to form a bundle wherein portions of the packaging material comprise laser energy absorbing material;
packaging the bundle with a wrapper made of a second packaging material so as to form a packaged bundle;
subjecting the packaged bundle to heat treatment within a heated tunnel, a temperature of the heat treatment applied by the heated tunnel is 300-400° F. and heat is applied to the packaged bundle for 20 to 45 seconds;
subjecting the portions of the first packaging material comprising laser energy absorbing material to laser energy to generate heat and attach the wrapper to the packaging material and
applying force to sides of the packaged bundle after heat treatment so as to fuse folded portions of the second packaging material together,
wherein 10 grams of force or less is required to separate the first package material from the second package material as tested in accordance with an ASTM D882-10 peel test method.

18. The method according to claim 17, wherein the laser energy absorbing material is selected from the group consisting of pigments, dyes, carbon black, rubber, graphite, ceramic and combinations thereof.

19. The method according to claim 18, wherein the amount of laser energy absorbing material is from about 0.01 to about 5 weight percent of the packaging material to which it is added or coated.

20. A direct-to-consumer heat shrunk bundled product comprising:
a plurality of paper product rolls each individually packaged by a first package material and arranged relative to one another so as to form a bundle, the bundle being packaged by a second package material, wherein folded gusset portions of the second package material comprise adhesive and a substantial portion of the inner surface of the second package material is in contact with the first package material of the plurality of paper product rolls and is nonstick relative to the first package material so that 10 grams of force or less is required to separate the first package material from the second package material as tested in accordance with an ASTM D882-10 peel test method.

* * * * *